United States Patent
Zembutsu et al.

(10) Patent No.: US 9,883,440 B2
(45) Date of Patent: **\*Jan. 30, 2018**

(54) SYSTEM, METHOD, AND APPARATUS FOR ESTABLISHING A CONNECTION BETWEEN A TERMINAL AND A NETWORK NODE

(71) Applicant: NEC Corporation, Tokyo (JP)

(72) Inventors: Hajime Zembutsu, Tokyo (JP); Toshiyuki Tamura, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/902,656

(22) PCT Filed: Jul. 4, 2014

(86) PCT No.: PCT/JP2014/067891
§ 371 (c)(1),
(2) Date: Jan. 4, 2016

(87) PCT Pub. No.: WO2015/002290
PCT Pub. Date: Jan. 8, 2015

(65) Prior Publication Data
US 2016/0174120 A1 Jun. 16, 2016

(30) Foreign Application Priority Data

Jul. 4, 2013 (JP) .................. 2013-141127
Sep. 10, 2013 (JP) .................. 2013-187106

(51) Int. Cl.
*H04W 36/16* (2009.01)
*H04W 36/00* (2009.01)
(Continued)

(52) U.S. Cl.
CPC ..... *H04W 36/165* (2013.01); *H04W 36/0005* (2013.01); *H04W 36/0055* (2013.01); *H04W 36/12* (2013.01); *H04W 36/36* (2013.01)

(58) Field of Classification Search
None
See application file for complete search history.

(56) References Cited

U.S. PATENT DOCUMENTS 7,782,818 B2   8/2010 Hurtta et al.
8,208,925 B2   6/2012 Attar et al.
(Continued)

FOREIGN PATENT DOCUMENTS

CN   101420724 A   4/2009
CN   102984775 A   3/2013
(Continued)

OTHER PUBLICATIONS

Nokia, "Default SGSN in areas supporting IuFlex", 3GPP TSG SA WG2#19, S2-012381, pp. 1-2, Aug. 2001.
(Continued)

*Primary Examiner* — Yemane Mesfin
*Assistant Examiner* — Peter Chen
(74) *Attorney, Agent, or Firm* — Finnegan, Henderson, Farabow, Garrett & Dunner, L.L.P.

(57) ABSTRACT

Using LAPI (low access priority indication) information of an RRC Connection Request from a terminal, a base station selects a specific mobility management node.

6 Claims, 25 Drawing Sheets

(51) Int. Cl.
*H04W 36/12* (2009.01)
*H04W 36/36* (2009.01)

(56) References Cited

U.S. PATENT DOCUMENTS

| | | | |
|---|---|---|---|
| 9,055,520 | B2 | 6/2015 | Salot et al. |
| 9,319,921 | B2 | 4/2016 | Kuroda |
| 9,374,777 | B2 | 6/2016 | Salot et al. |
| 2004/0017798 | A1 | 1/2004 | Hurtta et al. |
| 2004/0266438 | A1* | 12/2004 | Bjelland ........... H04W 36/0066 455/437 |
| 2005/0249121 | A1 | 11/2005 | Matsunaga |
| 2006/0172741 | A1 | 8/2006 | Jeong et al. |
| 2007/0254667 | A1* | 11/2007 | Jokinen ................. H04W 36/12 455/436 |
| 2009/0023448 | A1 | 1/2009 | Attar et al. |
| 2010/0056156 | A1 | 3/2010 | Xu et al. |
| 2011/0045834 | A1 | 2/2011 | Kim et al. |
| 2011/0183675 | A1 | 7/2011 | Bae et al. |
| 2011/0206009 | A1 | 8/2011 | Attar et al. |
| 2012/0071164 | A1 | 3/2012 | Hayashi |
| 2012/0113959 | A1 | 5/2012 | Sugizaki et al. |
| 2012/0218974 | A1 | 8/2012 | Zhou et al. |
| 2013/0021970 | A1 | 1/2013 | Lei |
| 2014/0036665 | A1* | 2/2014 | Chowdhury ........ H04L 12/5695 370/230 |
| 2014/0064099 | A1 | 3/2014 | Kuroda |
| 2014/0169269 | A1* | 6/2014 | Salot ..................... H04W 48/20 370/328 |
| 2014/0211782 | A1 | 7/2014 | Yamaguchi et al. |
| 2014/0341041 | A1* | 11/2014 | Velev ................... H04Q 3/0045 370/236 |
| 2015/0009988 | A1 | 1/2015 | Lim et al. |
| 2015/0085658 | A1 | 3/2015 | Hong et al. |
| 2015/0141030 | A1* | 5/2015 | Basu-Mallick ... H04W 28/0289 455/452.1 |
| 2015/0249956 | A1 | 9/2015 | Salot et al. |
| 2016/0029278 | A1* | 1/2016 | Poikonen .............. H04W 36/12 370/331 |
| 2016/0112896 | A1 | 4/2016 | Karampatsis et al. |

FOREIGN PATENT DOCUMENTS

| | | |
|---|---|---|
| EP | 2 747 376 A1 | 6/2014 |
| JP | 2003-338832 | 11/2003 |
| JP | 2006-197653 | 7/2006 |
| JP | 2012-110051 | 6/2012 |
| JP | 2013-516857 | 5/2013 |
| RU | 2 440 697 C2 | 1/2012 |
| WO | WO 2007/102953 A1 | 9/2007 |
| WO | WO 2012/062193 A1 | 5/2012 |
| WO | WO 2012/172729 A1 | 12/2012 |
| WO | WO 2013/023171 A1 | 2/2013 |
| WO | WO 2013/047822 A1 | 4/2013 |

OTHER PUBLICATIONS

Office Action dated Nov. 1, 2016, by the Japanese Patent Office in counterpart Japanese Patent Application No. 2015-241405.
"3GPP TS 23.401 V12.1.0", $3^{rd}$ Generation Partnership Project; Technical Specification Group Services and System Aspects; General Packet Radio Service (GPRS) enhancements for Evolved Universal Terrestrial Radio Access Network, (E-Utran) access (Release 12), pp. 1-4 and 45-49, Jun. 2013.
SA2, "LS on LAPI for NNSF", 3GPP TSG-SA WG2 Meeting #97, S2-132325, URL:http://www.3gpp.org/ftp/tsg_sa/WG2_Arch/TSGS2_97_busan/Docs/S2-132325.zip, May 2013.
International Search Report and Written Opinion dated Oct. 7, 2014 in corresponding PCT International Application.
Notice of Grounds for Rejection dated Oct. 6, 2015 by the Japanese Patent Office in counterpart Japanese Patent Application No. 2015-525288.
Decision to Grant dated Jul. 29, 2016 by the Russian Patent Office in counterpart Russian Patent Application No. 2016103470/07 (005358).
Decision to Grant dated Jul. 29, 2016 by the Russian Patent Office in counterpart Russian Patent Application No. 2016112137/07 (019095).
NTT Docomo, "Use of Low Access Priority Indication to select MME", SA WG2 Meeting #97, S2-131858, May 2013.
Huawei et al., "RAN2 solutions for MTC", 3GPP TSG-RAN WG2 Meeting #71bis, R2-105633, pp. 1-3, Oct. 2010.
"3GPP TS 23.236 V12.0.0", $3^{rd}$ Generation Partnership Project; Technical Specification Group Services and System Aspects; Intra-domain connection of Radio Access Network (RAN) nodes to multiple Core Network (CN) nodes (Release 12), pp. 1-40, Jun. 2013.
Extended European Search Report mailed on Jun. 17, 2016, by the European Patent Office in counterpart European Patent Application No. 16153026.6.
First Notice of Examination Opinion issued by the Chinese Patent Office in counterpart Chinese Patent Application No. 201610109364.2, dated Oct. 10, 2016.
Nokia Siemens Networks et al., "MSC/VLR selection for MTC devices", SA WG2 Meeting #97, S2-132078, May 2013.
Extended European Search Report dated Dec. 16, 2016, by the European Patent Office in counterpart European Patent Application No. 14820719.4.
Final Office Action dated May 26, 2017, in U.S. Appl. No. 15/061,120.
Non-Final Office Action dated Feb. 3, 2017, in U.S. Appl. No. 15/061,120.
Office Action dated Jul. 24, 2017, Korean Patent Application No. 10-2016-7026957.
3GPP TSG CT4 Meeting #51bis Ljubljana, Slovenia Jan. 24-28, C4-110157, 2011.

* cited by examiner

SYSTEM, METHOD, AND APPARATUS FOR ESTABLISHING A CONNECTION BETWEEN A TERMINAL AND A NETWORK NODE

FIELD

Reference to Related Application

The present invention is a National Stage Entry of International Application No. PCT/JP2014/067891, filed Jul. 4, 2014, which is based upon and claims the benefit of the priority of Japanese patent application No. 2013-141127, filed on Jul. 4, 2013, and Japanese patent application No. 2013-187106, filed on Sep. 10, 2013, the disclosures of which are incorporated herein in their entirety by reference thereto.

The present invention relates to a communication system, a method, and an apparatus.

BACKGROUND

In a core network of a mobile communication system, the entirety of nodes in the core network need to have necessary functions for each service in order to provide various services to various terminals (mobile terminals). For example, in a large-scale mobile communication network, many nodes are disposed in a core network. Terminals are connected to nodes in the core network, in a distributed manner, on per a location registration.

Thus, the entirety of nodes in the core network need to have necessary functions (service provision functions) for each service. If one of the nodes in the core network should not have necessary service provision functions, service continuity could not be ensured.

PTL 1 discloses a configuration for optimizing a packet forwarding path(s) based on a type of a service used by a mobile station. According to PTL 1, when the mobile station uses a service provided by an external network, a constraint is given to a packet forwarding path(s) so that packets flow through a specific packet forwarding apparatus(es) based on the external network. When the mobile station uses a service provided by a mobile communication network, no constraint is given to a packet forwarding path(s).

PTL 1: Japanese Patent Kokai Publication No. 2003-338832A

SUMMARY

The following describes analysis of related techniques.

As described above, since each node in a core network has all service provision functions, each node is required to have high functions and high performance. Consequently, each core network node is expensive.

For example, since a relatively small number of mobile terminals support MBMS (Multimedia Broadcast Multicast Service) (simultaneous delivery service) that is a bearer service that is standardized by 3GPP (3rd Generation Partnership Project) and that realizes broadcast delivery, the MBMS is not provided very frequently. However, if the service is going to be provided to a small number of MBMS users, a communication operator needs to be equipped with all the nodes in the core network with the MBMS functions. Otherwise, the communication operator cannot provide the service to the small number of MBMS users.

If the communication operator is adapted so as to be able to select nodes in the core network based on whether an individual mobile terminal needs to use the MBMS, by arranging a relatively small number of expensive core network nodes that are compatible with the MBMS, and many inexpensive core network nodes that are not compatible with the MBMS, in combination, the communication operator can reduce equipment costs as a whole more efficiently (a first knowledge of the present inventors).

Furthermore, 3GPP machine type communication (MTC: Machine Type Communication) devices (M2M devices), which have been in widespread use in recent years, significantly differ from normal terminals (handset terminals) such as mobile phone terminals and smartphones used for phone calls and the like in terms of mobility characteristics, required communication quality, and so forth. It is known that the machine type communication services ranges over various types, such as for remote management of stocks and charging of automatic vending machines, remote monitoring control in a sensor system or the like, vehicle monitoring, smart grid and so forth.

However, unless in the core network of the communication operator should be equipped with necessary capabilities and functions for successfully connecting to a MTC device and a handset terminal, the communication operator cannot provide the service to both of the MTC device and the handset terminal.

If a MTC device and a handset terminal can be connected to appropriate core network nodes, the communication operator can arrange a relatively inexpensive core network node for a handset terminal and another relatively inexpensive core network node for a MTC device in combination. The MTC device may be a terminal that notifies the core network nodes of low access priority indication or tolerance information against communication delay (the second knowledge of the present inventors).

In this way, when compared with installing a relatively expensive core network node configured to be able to cope with both of a handset terminal and a MTC device, the equipment cost as a whole can be reduced more efficiently (the third knowledge of the present inventors).

Thus, the present invention has been made to solve the above problem, and an object of the present invention is to provide a system, a method, and an apparatus for reducing the equipment cost in a core network as a whole and providing efficient handover functions.

The present invention that solves the above problem generally has (but not limited to) the following configuration.

According to an aspect of the present invention, there is provided a communication system including a core network of a mobile communication system, wherein the core network comprises a dedicated mobility management node adapted to be selected as a mobility management node dedicated for a terminal based on a characteristic of a service used by the terminal or a terminal type thereof, wherein the dedicated mobility management node is configured to select a mobility management node that is a handover destination, based on information of a dedicated mobility management node connection request held therein, when a handover between mobility management nodes is started.

According to another aspect of the present invention, there is provided a communication method, including:

providing a core network of a mobile communication system with a dedicated mobility management node that is selected as a mobility management node of a terminal, based on a characteristic of a service used by the terminal or a terminal type; and the dedicated mobility management node selecting a handover destination node, based on information of a dedicated mobility management node connection request held therein, when a handover between mobility management nodes is started.

According to another aspect of the present invention, there is provided a mobility management node apparatus serving as a dedicated mobility management node apparatus that has a function of managing mobility of a terminal and that is selected based on a characteristic of a service used by the terminal or a terminal type thereof, wherein the dedicated mobility management node is configured to select a mobility management node that is a handover destination, based on information of a dedicated mobility management node connection request held in the dedicated mobility management node, when a handover between mobility management nodes is started.

According to the present invention, the equipment cost in a core network as a whole can be reduced and efficient handover functions can be provided.

Still other features and advantages of the present invention will become readily apparent to those skilled in this art from the following detailed description in conjunction with the accompanying drawings wherein only exemplary embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

DETAILED DESCRIPTION

Figure 1:
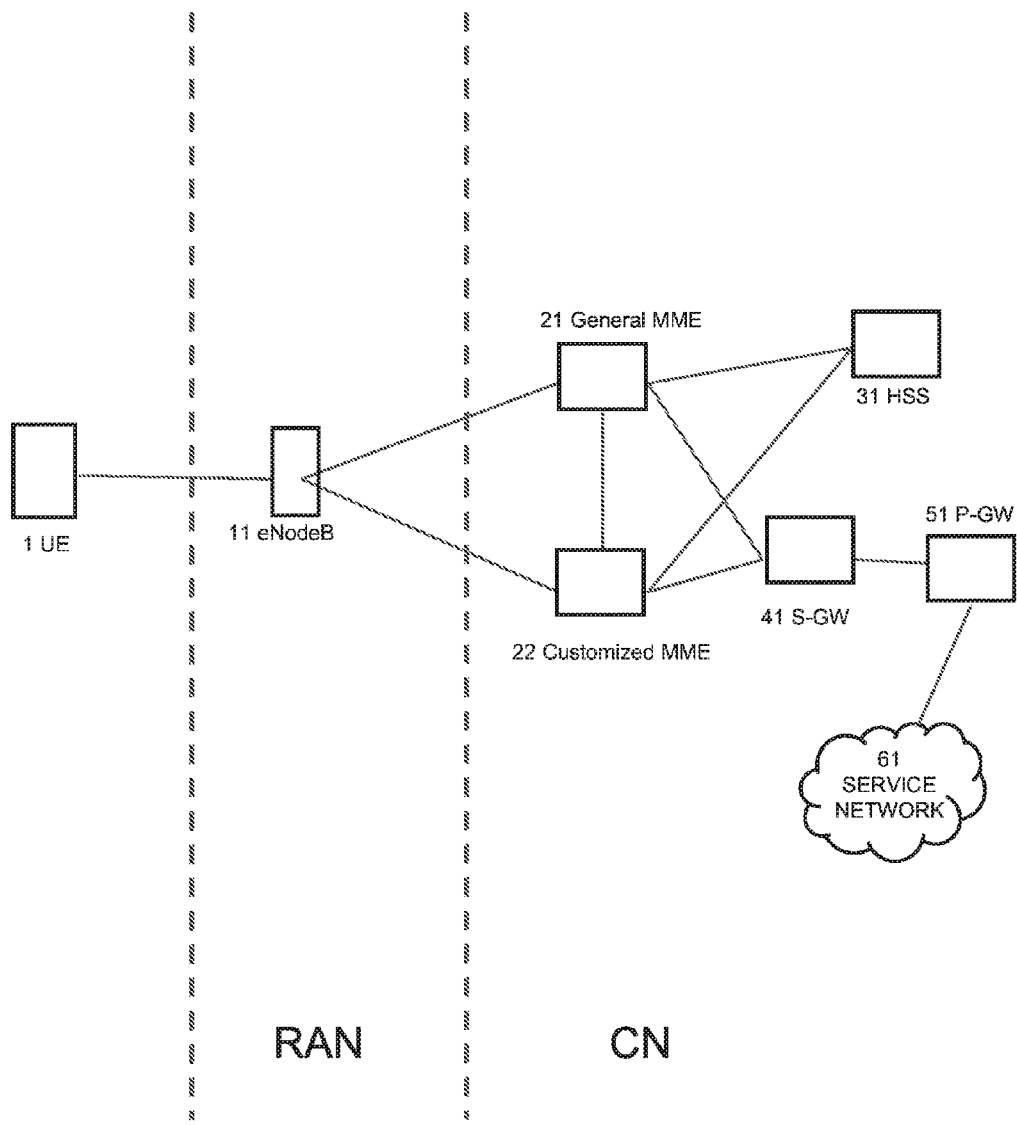
FIG. 1 illustrates an example of a system configuration according to a first exemplary embodiment of the present invention.

According to one embodiments of the present invention, a core network of a mobile communication system includes a dedicated mobility management node (dedicated MME/dedicated SGSN) that is selected as a mobility management node of a terminal based on a characteristic of a service used by the terminal or a terminal type, wherein when a handover between mobility management nodes is started, the dedicated mobility management node selects a mobility management node that is a handover destination based on information of a dedicated mobility management node connection request held in the dedicated mobility management node.

The core network includes a plurality of nodes (21/22 or 121/122) having different functions for providing services to a terminal. Based on subscriber information and terminal information, a node to be connected to the terminal is selected from the plurality of nodes, depending on a characteristic of a service used by the terminal or on a terminal type. As a result, the terminal (1) is connected to the selected node. Namely, in the core network, a node with a predetermined specific service provision function (22 or 122) and a node without the specific service provision function (21 or 121) are installed in combination.

Thus, since nodes optimized for the specific service provision function and nodes without the specific service provision function can separately be arranged, thereby allowing the costs of the nodes to be reduced.

According to the present invention, in a mobile communication network, a terminal can be connected to a dedicated core network node, and a handover can be performed, depending on conditions such as a characteristic of a service or a terminal type.

<Mode 1>

When a general MME (a Mobility Management Entity) receives an Attach Request from a UE (User Equipment such as a user device, a terminal, or a mobile terminal), in order to connect the UE to a specific MME (Customized MME, Specific MME), the general MME transmits an MME re-selection request signal (a mobility management entity re-selection request signal) to an eNodeB (evolved NodeB: a base station). The MME re-selection request signal may be a low access priority indication (LAPI) or a delay tolerant access. The LAPI is set so that the priority of M2M communication is set to be lower than that of general voice data communication. For example, each time an MTC device registers its location or transmits a signal to a network, the MTC device notifies the network of an LAPI (for example, an LAPI is included in an Attach Request signal of NAS (Non-Access Stratum) protocol), and the LAPI is held by an eNodeB, an MME, an SGW (Serving Gateway), a PGW (PDN (Packet Data Networks) Gateway), etc. The delay tolerant access is set in an RRC (Radio Resource Control) connection request message or the like and is adopted for control performed when the network is overloaded (see 3GPP Technical Specification 23.368, for example). The LAPI or delay tolerant access is an information element of which, for example, the MTC device (MTC terminal) notifies the network. The base station (eNodeB) may identify an MME based on these information elements (as markings).

The base station (eNodeB) may select a Customized MME for a terminal (UE) corresponding to low access priority. The terminal (UE) corresponding to low access priority is a terminal having an MTC function. The terminal (UE) having the low access priority configuration may provide the base station with information (LAPI) indicating that an RRC Connection Request has the low access priority, and the base station (eNodeB) may use the information (LAPI) provided from the terminal and steer the terminal (UE) having the low access priority configuration to the Customized MME.

By re-transmitting an Attach Request to the Customized MME, the eNodeB connects the UE to the Customized MME.

<Mode 2>
Upon reception of an Attach Request from a UE, in order to connect the UE to a Customized MME, a general MME transmits an MME change request signal (a mobility management entity change request signal) to the Customized MME. The Customized MME continues an Attach Procedure and connects the UE to the Customized MME.

<Mode 3>
Upon reception of an Attach Request from a UE, in order to connect the UE to a Customized MME, a general MME transmits an Attach Reject to which an identifier of the Customized MME is added to the UE. The UE adds the identifier of the Customized MME to an Attach Request and re-transmits the Attach Request, and thus the UE is made to connect to the Customized MME.

<Mode 4>
A UE transmits to an eNodeB an RRC (Radio Resource Control) Connection Request to which information of a customized-MME connection request is added. Upon reception of the RRC Connection Request, the eNodeB selects the Customized MME and connects the UE to the Customized MME, when the eNodeB transmits to an MME an Attach Request from the UE that has established RRC Connection with the eNodeB. The information of a customized MME connection request may be a low access priority indication (LAPI) or a delay tolerant access. The LAPI or delay tolerant access is an information element of which, for example, an MTC terminal notifies the network. The base station (eNodeB) may identify an MME based on these information elements.

<Mode 4-1>
Upon reception of an RRC (Radio Resource Control) signal to which the information of a customized MME connection request for connecting to the Customized MME is added from the UE, the eNodeB notifies the Customized MME of the information of a customized MME connection request via an S1-AP signal.

<Mode 4-2>
Upon reception of the information of a customized MME connection request from the eNodeB via an S1-AP signal, the Customized MME holds the information of a customized MME connection request.

<Mode 5>
When a general MME that has establishes a session with a UE, releases S1 connection that has been established between an eNodeB and the general MME (S1 Release), the general MME instructs the eNodeB to select a Customized MME, when the eNodeB selects an MME next time. Subsequently, when the UE transmits a location management area update request (a TA (Tracking Area) Update Request), the eNodeB selects the Customized MME and connects the UE to the Customized MME.

<Mode 6>
Upon reception of an Attach Request from a UE, in order to connect the UE to a Customized SGSN, a general SGSN (Serving GPRS (general Packet Radio Service) Support Node: which is described as "serving GPRS support node" in the claims) transmits an SGSN reselection request signal to an RNC (Radio Network Controller). By transmitting an Attach Request to the Customized SGSN, the RNC connects the UE to the Customized SGSN. The SGSN reselection request signal may be a low access priority indication (LAPI) or a delay tolerant access. Namely, the RNC may identify an SGSN based on an information element such as an LAPI or a delay tolerant access of which, for example, an MTC terminal notifies the network.

<Mode 7>
Upon reception of an Attach Request from a UE, in order to connect the UE to a Customized SGSN, a general SGSN transmits an SGSN change request signal to the Customized SGSN. The Customized SGSN continues an Attach Procedure and the UE is made to connect to the Customized SGSN.

<Mode 8>
Upon reception of an Attach Request from a UE, in order to connect the UE to a Customized SGSN, a general SGSN transmits an Attach Reject to which an identifier of the Customized SGSN is added to the UE. The UE adds the identifier of the Customized SGSN to an Attach Request and re-transmits the Attach Request, and thus the UE is made to connect to the Customized SGSN.

<Mode 9>
A UE transmits to an RNC a connection request (RRC Connection Request) to which information of a customized-SGSN connection request is added. Upon reception of the request, the RNC selects the Customized SGSN and connects the UE to the Customized SGSN, when the RNC transmits to an SGSN an Attach Request from the UE that has established RRC Connection with the RNC. The information of a customized SGSN connection request may be a low access priority indication (LAPI) or a delay tolerant access. Namely, the RNC may identify an SGSN based on an information element such as an LAPI or a delay tolerant access of which, for example, an MTC terminal notifies the network.

<Mode 9-1>
Upon reception of an RRC signal to which the information of a customized SGSN connection request for connecting to the Customized SGSN is added from the UE, the RNC notifies the Customized SGSN of the information of a customized SGSN connection request via an Iu signal.

<Mode 9-2>

Upon reception of the information of a customized SGSN connection request from the RNC via an Iu signal, the Customized SGSN holds the information of a customized-SGSN connection request.

<Mode 10>

When a general SGSN that has establishes a session with a UE, performs Iu Release, the general SGSN instructs an RNC to select a Customized SGSN when the RNC selects an SGSN next time. Subsequently, when the UE transmits a location management area update request (an RA (routing area) Update Request), the RNC selects the Customized SGSN and connects the UE to the Customized SGSN.

<Mode 11>

When a handover spanning MMEs is started, the Customized MME selects an MME that is a handover destination based on information of a customized MME connection request held in the Customized MME. The information of a customized MME connection request may be a low access priority indication (LAPI) or a delay tolerant access. In this case, the MME may be identified based on an information element such as the LAPI or delay tolerant access of which, for example, an MTC terminal notifies the network.

<Mode 11-1>

In selecting an MME that is a handover destination, the Customized MME may use a local configuration based on the information of a customized MME connection request held in the Customized MME. Alternatively, in selecting an MME that is a handover destination, the Customized MME may use a local configuration held in the Customized MME.

<Mode 11-2>

In selecting an MME that is a handover destination, the Customized MME may issue a query to a DNS (Domain Name System) server based on the information of a customized MME connection request held in the Customized MME and may select an MME from MMEs that are each a candidate of a handover destination and received from the DNS server as a result of the query.

<Mode 11-3>

A DNS server that can receive input information such as subscriber location information and the information of a customized MME connection request and can provide one or more MMEs.

<Mode 11-4>

When a handover spanning MMEs is started, the Customized MME that is a handover source notifies a Customized MME that is a handover destination of the information of a customized MME connection request held in the Customized MME that is a handover-source.

<Mode 12>

When a handover between SGSNs is started, the Customized SGSN selects a SGSN that is a handover destination based on information of a customized-SGSN connection request held in the Customized SGSN. The information of a customized SGSN connection request may be a low access priority indication (LAPI) or a delay tolerant access. In this case, the SGSN may be identified based on an information element such as the LAPI or delay tolerant access of which, for example, an MTC terminal notifies the network.

<Mode 12-1>

In selecting a SGSN that is a handover destination, the Customized SGSN may use a local configuration based on the information of a customized SGSN connection request held in the Customized SGSN. Alternatively, in selecting a SGSN that is a handover destination, the Customized SGSN may use a local configuration held in the Customized SGSN.

<Mode 12-2>

In selecting a SGSN that is a handover destination, the Customized SGSN may issue a query to a DNS server based on the information of a customized SGSN connection request held in the Customized SGSN and select an SGSN from SGSNs that are each a candidate of a handover destination and received from the DNS server as a result of the query.

<Mode 12-3>

A DNS server that can receive input information such as subscriber location information and the information of a customized SGSN connection request and can provide one or more SGSNs.

<Mode 12-4>

When a handover between SGSNs is started, the Customized SGSN that is a handover source notifies a Customized SGSN that is a handover destination of the information of a customized SGSN connection request held in the customized SGSN that is a handover source.

<Mode 13>

When a handover from an MME to an SGSN is started, the Customized MME selects an SGSN that is a handover destination based on information of a customized MME connection request held in the Customized MME. The information of a customized MME connection request may be a low access priority indication (LAPI) or a delay tolerant access. In this case, the SGSN may be identified based on an information element such as the LAPI or delay tolerant access of which, for example, an MTC terminal notifies the network.

<Mode 13-1>

In selecting a SGSN that is a handover destination, the Customized MME may use a local configuration based on the information of a customized MME connection request held in the Customized MME. Alternatively, in selecting a SGSN that is a handover destination, the Customized MME may use a local configuration held in the Customized MME.

<Mode 13-2>

In selecting a SGSN that is a handover destination, the Customized MME may issue a query to a DNS server based on the information of a customized MME connection request held in the Customized MME and select an MME from MMEs that are each a candidate of a handover destination and that are received from the DNS server as a result of the query.

<Mode 13-3>

When a handover from an MME to an SGSN is started, the Customized MME that is a handover source notifies a Customized SGSN that is a handover destination of the information of a customized MME connection request held in the Customized MME that is a handover-source.

<Mode 13-4>

A system in which the information of a customized MME connection request and the information of a customized SGSN connection request are equally handled as the same information.

<Mode 13-5>

A system in which the information of a customized MME connection request and the information of a customized SGSN connection request are handled as different information.

<Mode 14>

When a handover from an SGSN to an MME is started, the Customized SGSN selects an MME that is a handover destination based on information of a customized-SGSN connection request held in the Customized SGSN. The information of a customized SGSN connection request may be a low access priority indication (LAPI) or a delay tolerant access. In this case, the MME may be identified based on an information element such as the LAPI or delay tolerant access of which, for example, an MTC terminal notifies the network.

<Mode 14-1>

In selecting an MME that is a handover destination, the Customized SGSN may use a local configuration based on the information of a customized SGSN connection request held in the Customized SGSN. Alternatively, in selecting an MME that is a handover destination, the Customized SGSN may use a local configuration held in the Customized SGSN.

<Mode 14-2>

In selecting an MME that is a handover destination, the Customized SGSN may issue a query to a DNS server based on the information of a customized SGSN connection request held in the Customized SGSN and select an MME from MMEs that are each a candidate of handover destination and that are received from the DNS server as a result of the query.

<Mode 14-3>

When a handover from an SGSN to an MME is started, the Customized SGSN that is a handover source notifies a Customized MME that is a handover destination of the information of a customized SGSN connection request held in the Customized SGSN that is a handover source.

<Mode 14-4>

A system in which the information of a customized MME connection request and the information of a customized SGSN connection request are equally handled as the same information.

<Mode 14-5>

A system in which the information of a customized MME connection request and the information of a customized SGSN connection request are handled as different information.

<Mode 15>

A UE transmits to an eNodeB an RRC (Radio Resource Control) Connection Request to which information of a customized-MME connection request is added. Upon reception of the RRC Connection Request, when the eNodeB transmits a Tracking Area Update Request from the UE that has established RRC Connection to a new MME, the eNodeB selects the Customized MME and connects the UE to the Customized MME. The information of a customized MME connection request may be a low access priority indication (LAPI) or a delay tolerant access. In this case, the eNodeB may determine the MME based on an information element such as the LAPI or delay tolerant access of which, for example, an MTC terminal notifies the network.

<Mode 15-1>

Upon reception of an RRC signal to which the information of a customized MME connection request for connecting to the Customized MME is added from the UE, the eNodeB notifies the Customized MME of the information of a customized MME connection request via an S1-AP signal.

<Mode 15-2>

Upon reception of the information of a customized MME connection request from the eNodeB via an S1-AP signal, the Customized MME holds the information of a customized MME connection request.

<Mode 15-3>

A system in which the information of a customized MME connection request and the information of a customized SGSN connection request are equally handled as the same information.

<Mode 15-4>

A system in which the information of a customized MME connection request and the information of a customized SGSN connection request are handled as different information.

<Mode 16>

A UE transmits to an RNC a connection request (an RRC Connection Request) to which information of a customized-SGSN connection request is added. Upon reception of the request, when the RNC transmits a routing area Update Request from the UE that has established RRC Connection to a new SGSN, the RNC selects the Customized SGSN and connects the UE to the Customized SGSN. The information of a customized SGSN connection request may be a low access priority indication (LAPI) or a delay tolerant access. In this case, the RNC may determine the SGSN based on an information element such as the LAPI or delay tolerant access of which, for example, an MTC terminal notifies the network.

<Mode 16-1>

Upon reception of an RRC signal to which the information of a customized SGSN connection request for connecting to the Customized SGSN is added from the UE, the RNC notifies the Customized SGSN of the information of a customized SGSN connection request via an Iu signal.

<Mode 16-2>

Upon reception of the information of a customized SGSN connection request from the RNC via an Iu signal, the Customized SGSN holds the information of a customized-SGSN connection request.

<Mode 16-3>

A system in which the information of a customized MME connection request and the information of a customized SGSN connection request are equally handled as the same information.

<Mode 16-4>

A system in which the information of a customized MME connection request and the information of a customized SGSN connection request are handled as different information.

As described in the above Modes 1 to 16, according to the present invention, a core network node is selected and connected to a terminal, based on a characteristic of a service used by the terminal. In this way, in the core network, nodes with specific service provision functions and nodes without such functions can be arranged in combination. Namely, the nodes can be distinguished, by optimizing specific nodes to have specific service provision functions and by configuring other nodes without such specific service provision functions. As a result, the costs of nodes can be reduced. The following describes exemplary embodiments and specific examples will be described with reference to the drawings.

EXEMPLARY EMBODIMENT 1

FIG. 1 illustrates an exemplary embodiment 1 of the present invention. As the exemplary embodiment 1, a configuration with EPC (Evolved Packet Core) will be described. In this configuration, a UE transmits an Attach Request and the UE is connected to a Customized MME.

In FIG. 1, a UE 1 (user equipment) is a portable phone terminal (mobile terminal) or the like. For example, the UE 1 may be the above described MTC device, MBMS-compatible terminal, or the like.

An eNodeB 11 is a base station apparatus in LTE (Long Term Evolution).

An MME 21 and an MME 22 are mobility management apparatuses introduced in EPC. The Customized MME 22 is a specific MME to which the UE 1 needs to be connected and the general MME (21) is an MME other than the Customized MME. Though not particularly limited thereto, for example, the Customized MME 22 is configured as an MME customized for a machine communication (MTC) service and for terminals compatible therewith (M2M devices) (for example, reinforcement of C-Plane handling network control is carried out). Alternatively, the Customized MME 22 may be configured as an MBMS-compatible MME.

An HSS (Home Subscriber Server) 31 is a database storing subscriber information.

An S-GW (Serving GateWay) 41 and a P-GW (Packet data network GateWay, which is also referred to as PDN-GW) 51 are apparatuses handling a user plane.

A service network 61 is an external network.

In FIG. 1, the eNodeB is an apparatus in a radio access network (RAN) and the MMEs, the S-GW, the P-GW, and so forth are apparatuses in a core network (CN).

The following describes the above exemplary embodiment 1 based on several examples with different control schemes. Examples 1 to 5 correspond to the above Modes 1 to 5, respectively.

EXAMPLE 1

Figure 3:
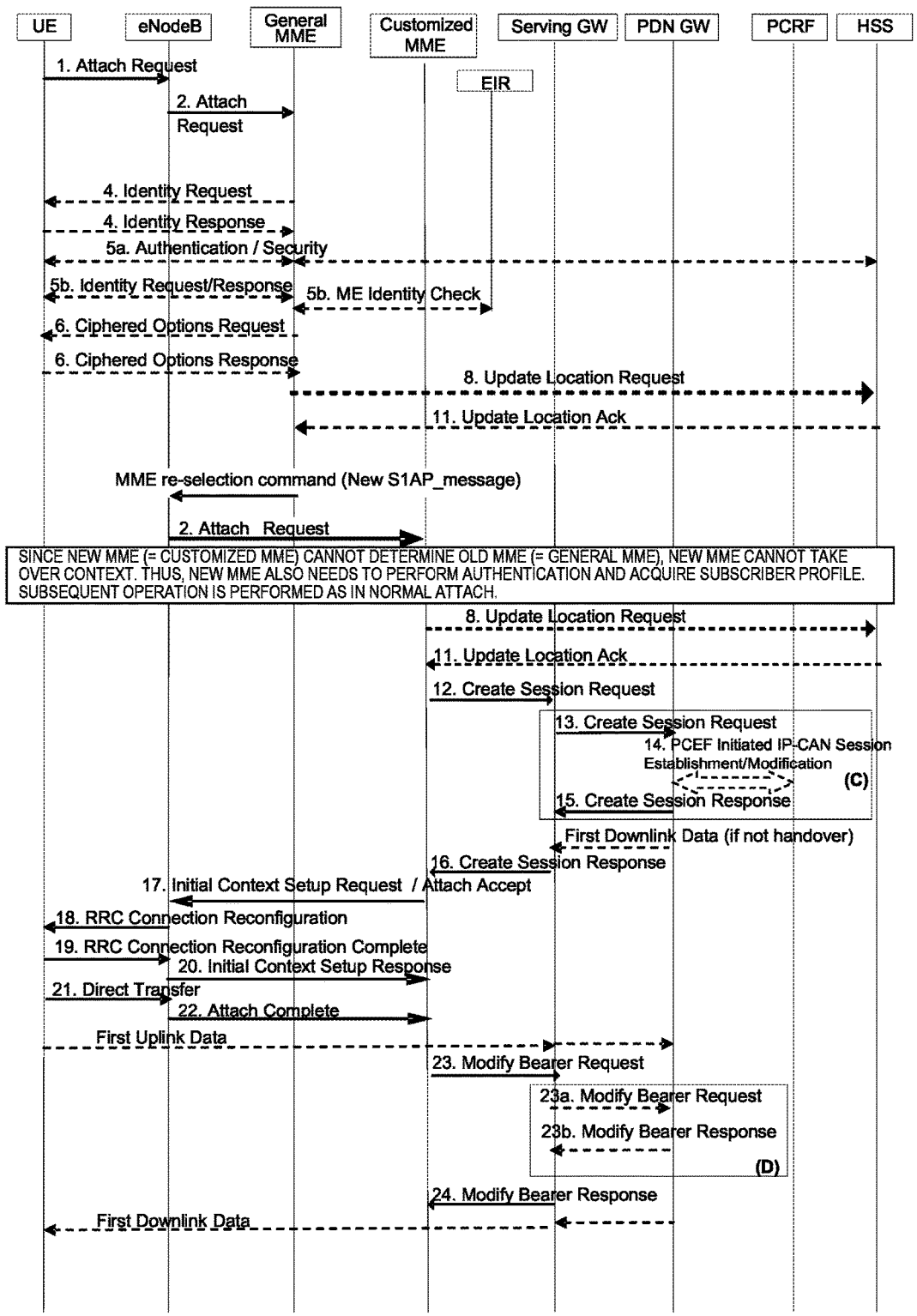
FIG. 3 illustrates an example of a sequence according to a first example of the present invention.

FIG. 3 is a sequence diagram illustrating an example of an operation according to example 1.

In FIG. 3,

"UE" corresponds to the UE 1 in FIG. 1,

"eNodeB" corresponds to eNodeB 11 in FIG. 1,

"general MME" corresponds to the general MME 21 in FIG. 1,

"Customized MME" corresponds to the Customized MME 22 in FIG. 1,

"Serving GW" corresponds to the S-GW 41 in FIG. 1,

"PDN GW" corresponds to the P-GW 51 in FIG. 1, and

"HSS" corresponds to the HSS 31 in FIG. 1.

"PCRF" is a Policy and Charging Rules Function. EIR (Equipment Identity Register) holds IMEI (International Mobile Equipment Identity) and the like and is connected to an MME via an S13 interface.

In FIG. 3, for example, "1. Attach Request" represents that transmission of an Attach Request from the UE to the eNodeB is sequence 1. To distinguish the reference character of this sequence from reference character 1 of the UE in FIG. 1 (from the reference characters of the components), this sequence number 1 will be represented in parentheses as "Attach Request (1)" in the following description. The other sequence numbers are also represented in the same way. The sequence numbers in FIG. 4 and in the subsequent sequence diagrams will also be represented in the same way. FIG. 3 is based on FIG. 5.3.2.1-1: Attach Procedure in 3GPP TS23.401 and the sequence numbers are in accordance with this figure. As for details of each sequence, reference may be made to description of 3GPP TS23.401 5.3.2. Hereinafter, the operation sequence will be described with reference to FIGS. 1 and 3.

As illustrated in FIG. 3, when the UE 1 transmits an Attach Request (1), first, the eNodeB 11 receives the Attach Request (1). Next, the eNodeB 11 relays the Attach Request (2) to an MME.

However, the eNodeB 11 cannot uniquely determine whether to forward the Attach Request (2) to the general MME 21 or to the Customized MME 22. Thus, there is a case where the eNodeB 11 forwards the Attach Request (2) to the general MME 21.

Upon reception of the Attach Request (2), the general MME 21 acquires terminal information (ME Identity) from the UE 1 using an Identity Request/Response (4, 5b).

The general MME 21 transmits an ME Identity Check Request (5b) to the EIR, and the EIR transmits an ME Identity Check Ack to the general MME. The general MME 21 performs, in coordination with the HSS 31, authentication and acquires a subscriber profile. Namely, in this case, at least, the general MME 21 performs authentication and acquires a subscriber profile.

Upon acquisition of the terminal information and the subscriber profile, the general MME 21 determines whether to connect the UE 1 to the general MME 21 or to the Customized MME 22.

When the general MME 21 determines that the UE 1 needs to be connected to the general MME 21, the general MME 21 continues a normal Attach Procedure.

When the general MME 21 determines that the UE 1 needs to be connected to the Customized MME 22, to instruct re-selection of an MME, the general MME 21 transmits an MME selection signal (an MME re-selection command) (S1AP (S1 application) signal newly introduced in the present exemplary embodiment) to the eNodeB 11.

In this sequence, the general MME 21 sets an identifier of the Customized MME 22 (for example, a GUMMEI (Globally Unique MME Identity)) in the MME re-selection command signal. Namely, before a bearer is generated in the core network, the general MME 21 transmits to the eNodeB a re-selection request in which necessary information (GUMMEI) for selecting a new MME is included. The MME have a function of deciding whether a UE is a re-selection target.

When the eNodeB 11 receives the MME re-selection command signal, in accordance with the identifier set in this signal, the eNodeB 11 selects the Customized MME 22 and forwards the Attach Request (2) to the Customized MME 22. Since the Customized MME 22 needs an NAS (Non-Access Stratum) parameter of the Attach Request (used for authentication between the UE and the MME), the eNodeB 11 transmits the Attach Request. The eNodeB 11 needs to have a function of storing the NAS message.

Since the new MME (=the Customized MME 22) cannot determine the old MME (=the general MME), the new MME cannot take over context from the old MME (=the general MME). Thus, the new MME (=the Customized MME: MME 22) also needs to perform authentication and acquire the subscriber profile.

Upon reception of the Attach Request signal, the Customized MME 22 acquires the terminal information using an Identity Request/Response. Furthermore, the Customized MME 22 performs authentication and acquires a subscriber profile in coordination with the HSS 31. Namely, the Customized MME 22 performs the same processing as that performed by the general MME 21.

Upon acquiring the terminal information and the subscriber profile, the Customized MME 22 determines whether to connect the UE 1 to the general MME 21 or to the Customized MME 22.

In this case, since the Customized MME 22 has been re-selected by the eNodeB 11, the Customized MME 22 continues a normal Attach Procedure, without transmitting an MME re-selection command signal. Namely, the following operations are performed:

transmission of an Update Location Request (8) from the Customized MME 22 to the HSS 31, transmission of an Update Location Ack (11) from the HSS 31 to the Customized MME 22, transmission of a Create Session Request (12) from the Customized MME 22 to the S-GW 41, transmission of a Create Session Request (13) from the S-GW 41 to the P-GW 51, PCEF (Policy and Charging Rules Function) Initiated IP-CAN (IP Connectivity Access Network) Session Establishment/Modification procedure (14) between the P-GW 51 and the PCRF, transmission of a Create Session Response (15) from the P-GW 51 to the S-GW 41, transmission of First Down Link Data from the P-GW 51 to the S-GW 41 (if not handover (HO)), transmission of a Create Session Response (16) from the S-GW 41 to the Customized MME 22, transmission of an Initial Context Setup Request/Attach Accept) (17) from the Customized MME 22 to the eNodeB 11, transmission of an RRC Connection Reconfiguration (18) from the eNodeB 11 to the UE 1, transmission of an RRC Connection Reconfiguration Complete (19) from the UE 1 to the eNodeB 11, transmission of an Initial Context Setup Response (20) from the eNodeB 11 to the Customized MME 22, transmission of a Direct Transfer (21) from the UE 1 to the eNodeB 11, transmission of an Attach Complete (22) from the eNodeB 11 to the Customized MME 22, transmission of First Uplink Data from the UE 1 to the S-GW 41 and the P-GW 51, transmission of a Modify Bearer Request (23) from the Customized MME 22 to the S-GW 41, transmission of a Modify Bearer Request (23a) from the S-GW 41 to the P-GW 51, transmission of a Modify Bearer Response (23b) from the P-GW 51 to the S-GW 41, transmission of a Modify Bearer Response (24) from the S-GW 41 to the Customized MME 22, and transmission of First Downlink data from the P-GW 51 and the S-GW 41 to the UE 1.

The general MME 21 and the Customized MME 22 have a function of deciding which MME is to be connected to the UE 1. This decision is made based on information transmitted from the UE 1. The information may be:

IMSI (International Mobile Subscriber Identity),
IMEI (International Mobile Equipment Identity: (terminal Identity)),
UE network capability,
MS network capability,
Mobile station classmark 2,
Mobile station classmark 3,
Device properties,
APN (Access Point Name),
ID that identifies an MTC group,
low access priority indication,
delay tolerant access,
another new parameter of a NAS signal such as an Attach Request or a TA Update Request which will be added in the future, or
an identifier of a part of such a parameter (for example, a PLMN (Public land Mobile Network)-id included in the IMSI).

Alternatively, the above determination may be made based on information transmitted from the HSS 31. The information may be:

Feature-List,
APN (Access Point Name),
a new parameter of an Update Location Answer/Insert Subscriber Data Request signal which will be added in the future, or
an identifier of a part of such a parameter.

Any one of or a combination of these items of information may be used for the above determination.

Though not illustrated in FIG. 3, even when an Attach Request signal is forwarded from the UE 1 that needs to be connected to the general MME 21 to the Customized MME 22, the Customized MME 22 can request the eNodeB 11 to select the general MME 21 in a like manner.

As described above, in the present example, MME instructs the eNodeB to perform MME re-selection. In response to the instruction, the eNodeB performs re-selection of an MME and the Attach Procedure is continued. In this way, the UE can be attached to an appropriate MME.

EXAMPLE 2

As example 2, another example with EPC (Evolved Packet Core) will be described. In this example, the UE transmits an Attach Request and the UE is connected to the Customized MME. In example 2, the same system configuration as that in example 1 will be used.

Figure 4:
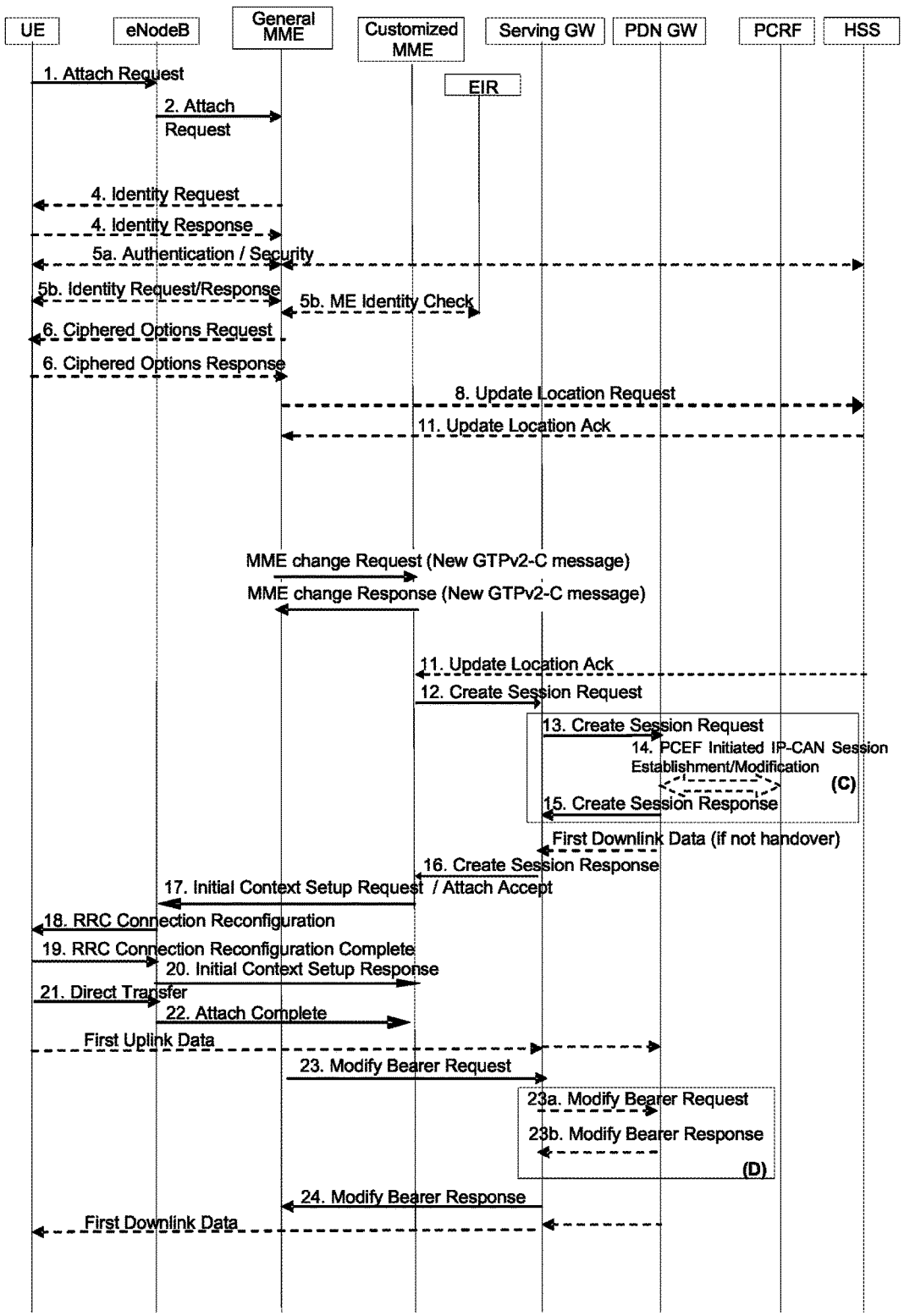
FIG. 4 illustrates an example of a sequence according to a second example of the present invention.

FIG. 4 is a sequence diagram illustrating an example of an operation according to example 2. FIG. 4 is based on FIG. 5.3.2.1-1: Attach Procedure in 3GPP TS23.401 and the sequence numbers are in accordance with this figure. As for details of each sequence, reference may be made to description of TS23.401 5.3.2. Hereinafter, the operation will be described with reference to FIGS. 1 and 4.

When the UE 1 transmits an Attach Request (1), the eNodeB 11 receives the Attach Request (1). Next, the eNodeB 11 relays the Attach Request (2) to an MME. However, the eNodeB 11 cannot uniquely determine whether to forward the Attach Request (2) to the general MME 21 or to the Customized MME 22. Thus, there is a case where the eNodeB 11 forwards the Attach Request (2) to the general MME 21.

Upon reception of the Attach Request (2), the general MME 21 acquires terminal information (ME Identity) using an Identity Request/Response (5b). The general MME 21 performs, in coordination with the HSS 31, authentication and acquires a subscriber profile. Namely, in this case, at least, the general MME 21 performs authentication and acquires a subscriber profile.

Upon acquiring the terminal information and the subscriber profile, the general MME 21 determines whether to connect the UE 1 to the general MME 21 or to the Customized MME 22. When the general MME 21 determines that the UE 1 needs to be connected to the general MME 21, the general MME 21 continues a normal Attach Procedure.

When the general MME 21 determines that the UE 1 needs to be connected to the Customized MME 22, to instruct change of an MME, the general MME 21 transmits an MME change request signal (MME Change Request) (a GTP (GPRS Tunneling Protocol) signal newly introduced in the present example) to the Customized MME 22.

In this sequence, the general MME 21 sets context information generated by authentication of the terminal and acquisition of the subscriber profile in the MME Change Request signal.

Upon reception of the MME change request signal (MME Change Request), the Customized MME 22 holds the context information set in the MME change request signal and transmits an MME Change Response signal (a GTP signal newly introduced in the present example) to the general MME 21.

Subsequently, the Customized MME 22 transmits an Update Location Request signal (8) to the HSS 31 to notify the HSS 31 that the MME has been changed.

To notify the HSS 31 of the changed MME, the Customized MME 22 transmits an Update Location Request. The subsequent Attach Procedure is performed by the Customized MME 22.

When security context information transmitted from the general MME 21 is valid, the Customized MME 22 can omit performing re-authentication.

Subsequently, the Customized MME 22 continues the Attach Procedure and the eNodeB 11 receives an Initial Context Setup Request/Attach Accept (17) from the Customized MME 22.

The Initial Context Setup Request/Attach Accept (17) is a response to the Attach Request (2) received by the general MME 21. The eNodeB 11 needs to include a function of receiving a Response from another MME different from the general MME 21.

Subsequently, the Customized MME 22 continues a normal Attach Procedure.

The general MME 21 and the Customized MME 22 have a function of deciding which MME is to be connected to the UE 1, as is the case with example 1.

Though not illustrated in FIG. 4, even when an Attach Request signal is forwarded from the UE 1 that needs to be connected to the general MME 21 to the Customized MME 22, the Customized MME 22 can request the general MME 21 for change of an MME in a like manner.

As described above, in the present example, the general MME instructs the Customized MME about change of an MME. In response to the instruction, the Customized MME performs the change of an MME and continues the Attach Procedure. In this way, the UE can be attached to an appropriate MME.

EXAMPLE 3

As example 3, another example with EPC will be described. In this example, the UE transmits an Attach Request and the UE is connected to the Customized MME. In example 3, the same system configuration as that in example 1 will be used.

Figure 5:
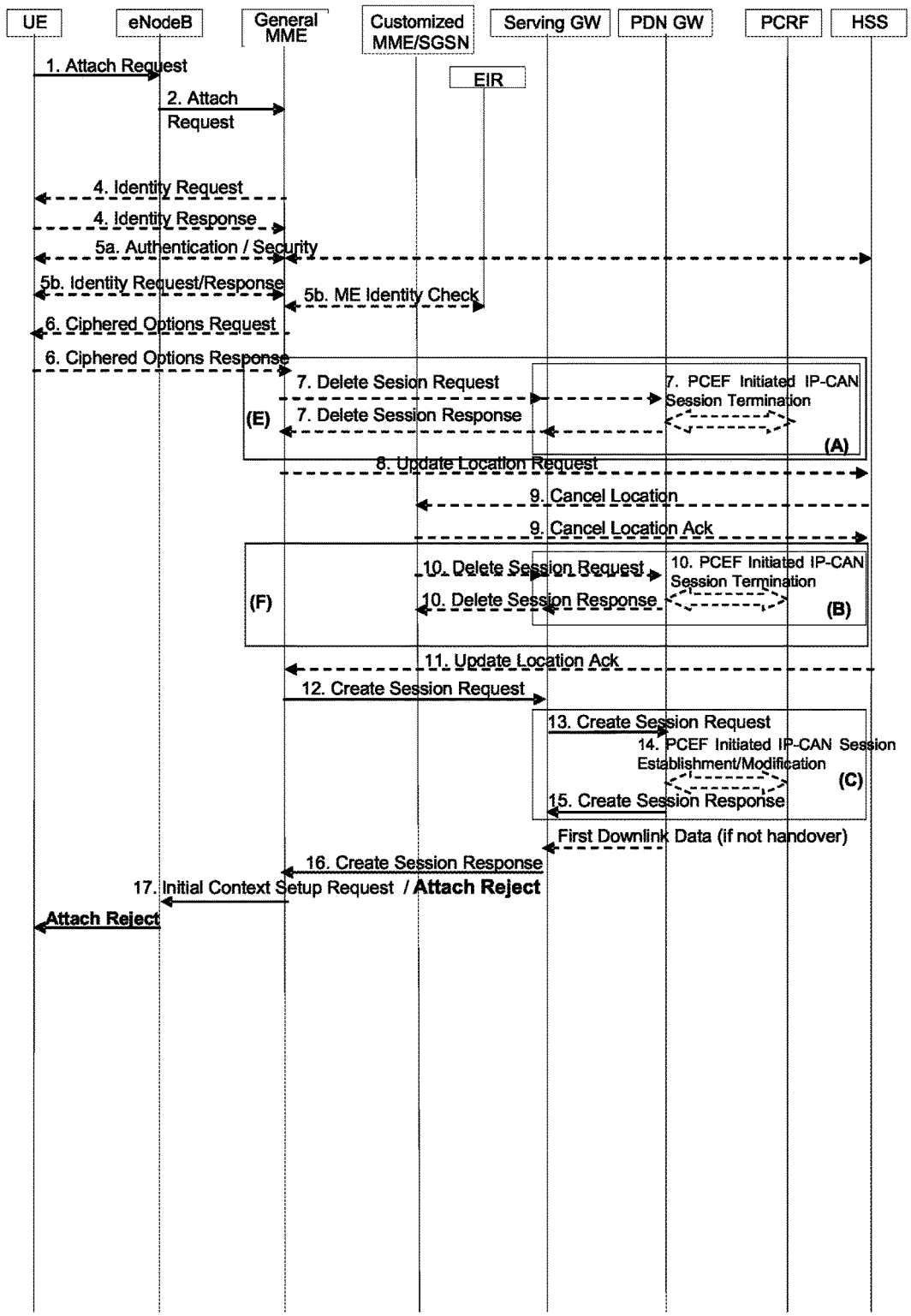
FIG. 5 illustrates an example of a sequence according to a third example of the present invention.
Figure 6:
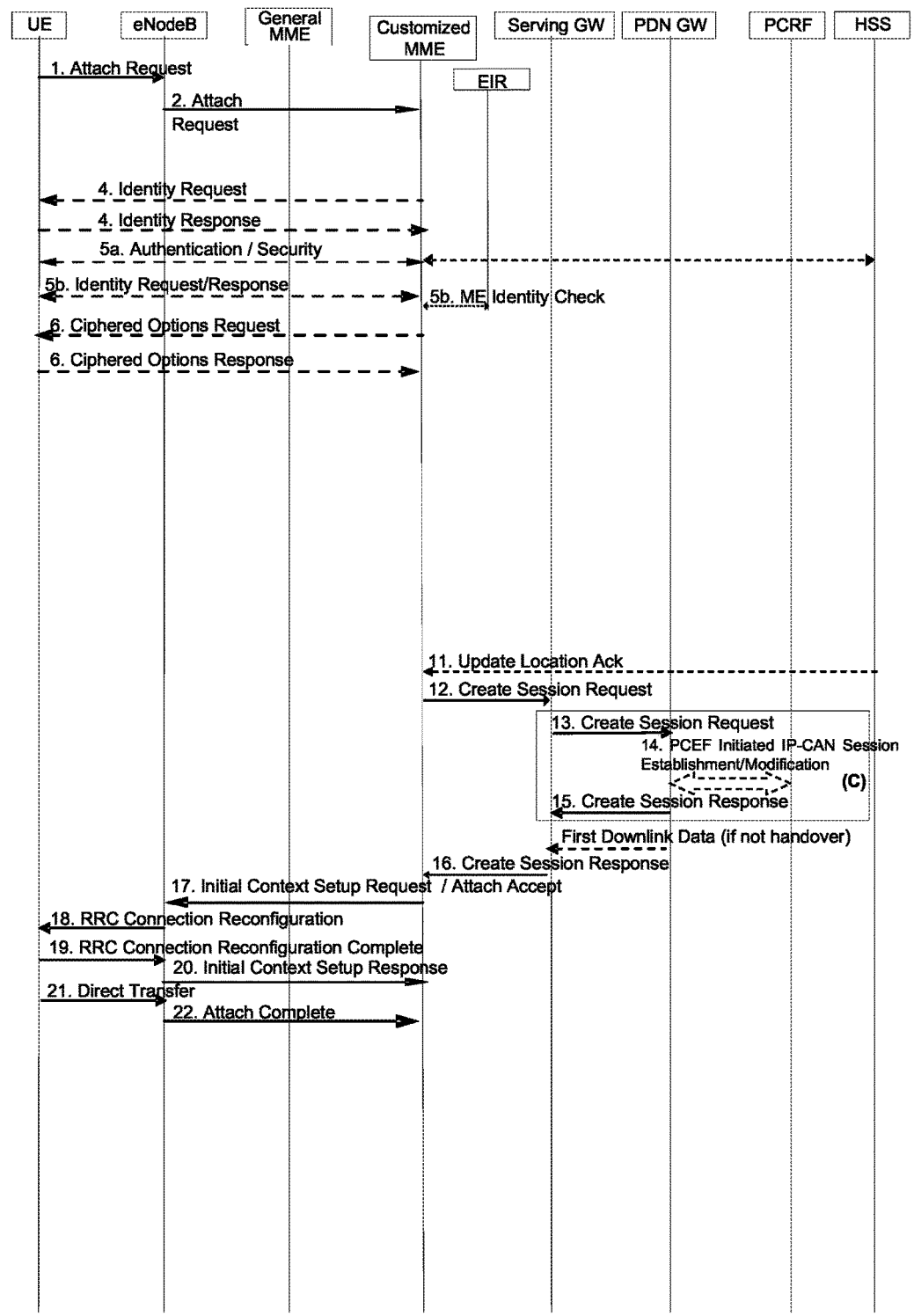
FIG. 6 illustrates an example of a sequence according to the third example of the present invention.

FIGS. 5 and 6 are sequence diagrams illustrating an example of an operation according to example 3. FIGS. 5 and 6 are based on FIG. 5.3.2.1-1: Attach Procedure in 3GPP TS23.401 and the sequence numbers are in accordance with these figures. As for details of each sequence, reference may be made to description of TS23.401 5.3.2. Hereinafter, the operation will be described with reference to FIGS. 1, 5, and 6.

When the UE 1 transmits an Attach Request (1), first, the eNodeB 11 receives the Attach Request (1). Next, the eNodeB 11 forwards the Attach Request (2) to an MME. However, the eNodeB 11 cannot uniquely determine whether to forward the Attach Request (2) to the general MME 21 or to the Customized MME 22. Thus, there is a case where the eNodeB 11 forwards the Attach Request (2) to the general MME 21.

Upon reception of the Attach Request (2), the general MME 21 acquires terminal information (ME Identity) using an Identity Request/Response (5*b*). The general MME 21 performs, in coordination with the HSS 31, authentication and acquires a subscriber profile.

Upon acquiring the terminal information and the subscriber profile, the general MME 21 determines whether to connect the UE 1 to the general MME 21 or to the Customized MME 22. When the general MME 21 determines that the UE 1 needs to be connected to the general MME 21, the general MME 21 continues a normal Attach Procedure.

When the general MME 21 determines that the UE 1 needs to be connected to the Customized MME 22, the general MME 21 transmits an Attach Reject message to the UE 1, instead of continuing the Attach Procedure. Namely, the general MME 21 transmits an Initial Context Setup Request/Attach Reject (17) to the eNodeB 11.

In this case, the general MME 21 sets one or more parameters for instructing re-attach (a new parameter introduced in the present example) and a GUTI (Globally Unique Temporary Identify) parameter including a GUMMEI (Globally Unique MME identifier) (a new parameter introduced in the present example) in the Attach Reject signal, so that the eNodeB 11 can select the Customized MME 22 when performing re-attach. The GUTI parameter is formed by a GUMMEI and an M-TMSI (Temporary Mobile Station Identity). An MMEI is formed by an MCC (Mobile Country Code), an MNC (Mobile Network Code), and an MME Identifier. While these parameters are parameters that are newly introduced in the present example, since the eNodeB 11 is transparent to these parameters, the eNodeB 11 is not affected.

Upon reception of the Attach Reject signal from the eNodeB 11, as illustrated in FIG. 6, the UE 1 transmits the Attach Request (1) in which the GUTI has been set (Attach by the GUTI) to the eNodeB 11, in accordance with the parameter for instructing re-attach set in the Attach-Reject signal and the GUTI parameter. The eNodeB 11 determines that an appropriate MME from the GUMMEI included in the GUTI and forwards the Attach Request (2) to the Customized MME 22.

The UE 1 has a function of receiving a GUTI in an Attach Reject signal and using the GUTI specified in the Attach Reject when transmitting a re-attach (Attach Request (1) in FIG. 6). In the MME, a function of deciding whether this UE is a re-selection target is implemented.

Subsequently, the Customized MME 22 continues a normal Attach Procedure. While the GUTI is set in the Attach Request, the Customized MME 22 does not hold context information.

Thus, upon reception of the Attach Request signal, the Customized MME 22 acquires terminal information using an Identity Request/Response (4). Furthermore, the Customized MME 22 performs authentication and acquires a subscriber profile in coordination with the HSS 31.

The general MME 21 and the Customized MME 22 have a function of deciding which MME is to be connected to the UE 1, as is the case with example 1.

While not illustrated in FIGS. 5 and 6, even when an Attach Request signal is forwarded from the UE 1 that needs to be connected to the general MME 21 to the Customized MME 22, the Customized MME 22 can request the UE 1 for re-selection of an MME in a like manner.

As described above, in the present example, the general MME instructs the UE to perform re-selection of an MME.

In response to the instruction, the UE specifies the Customized MME to continue an Attach Procedure. In this way, the UE can be attached to an appropriate MME.

EXAMPLE 4

Figure 7:
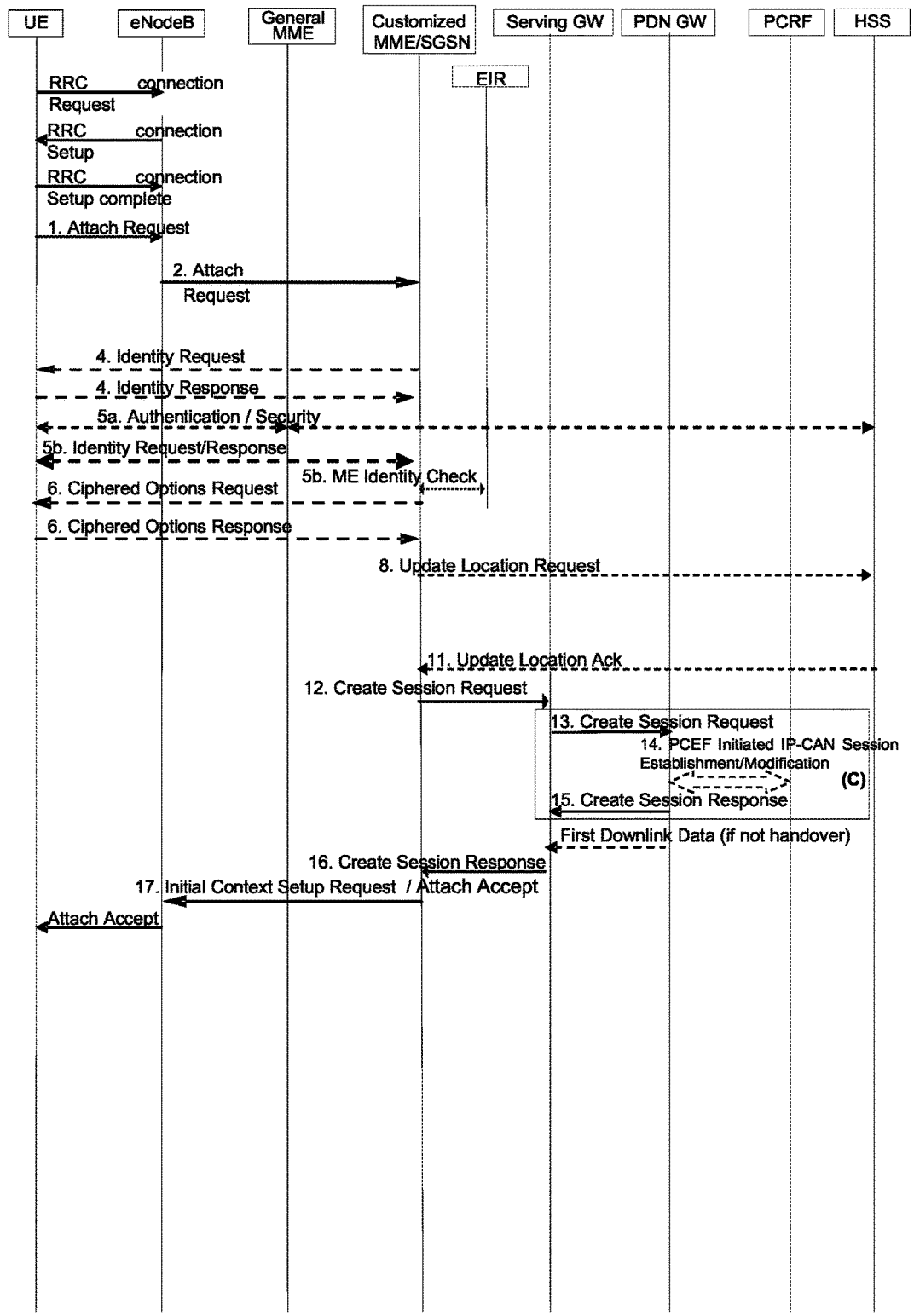
FIG. 7 illustrates an example of a sequence according to a fourth example of the present invention.

As example 4, another example with EPC will be described. In this example, the UE transmits an Attach Request and the UE is connected to the Customized MME. In example 4, the same system configuration as that in example 1 will be used. FIG. 7 is a sequence diagram illustrating an example of an operation according to example 4. FIG. 7 is based on FIG. 5.3.2.1-1: Attach Procedure in 3GPP TS23.401 and the sequence numbers are in accordance with the figure. For details of each sequence, reference may be made to TS23.401 5.3.2. Hereinafter, the operation will be described with reference to FIGS. 1 and 7.

To transmit an Attach Request (1) to an MME, first, the UE 1 establishes RRC connection with the eNodeB 11. To establish RRC connection, first, the UE 1 transmits an RRC Connection Request signal to the eNodeB 11.

In this signal, the UE 1 sets one or more parameters indicating that the UE 1 needs to be connected to the Customized MME 22 (User Identity, a new Value or a new parameter of Establishment Cause (a value or a parameter newly introduced in the present example), or an identifier of a part of such a parameter (a PLMN-id (Public Land Mobile Network Identify) included in the IMSI, for example)).

The UE 1 is implemented with a new parameter of the RRC Connection Request (a new Value or a new parameter of an establishment Cause (an information element (communication establishment cause) that indicates a cause of transmission of an RRC Connection Request)), wherein by using the RRC Connection Request, the UE 1 notifies the eNodeB that the UE 1 can be connected to the Customized MME.

Upon reception of the RRC Connection Request signal, the eNodeB 11 stores information indicating that the UE 1 needs to be connected to the Customized MME 22 and continues the subsequent RRC Connection Procedure.

After establishing RRC Connection, the UE 1 transmits an Attach Request (1) and the eNodeB 11 receives the Attach Request (1). From the information (indicating that the UE 1 needs to be connected to the Customized MME 22) stored when the eNodeB 11 has received the RRC Connection Request (1), the eNodeB 11 forwards an Attach Request (2) to the Customized MME 22.

The eNodeB 11 sets a new parameter of the RRC Connection Request (a new Value or a new parameter of Establishment Cause) in the Attach Request (2). The parameter indicates that the UE 1 can be connected to the Customized MME indicated in the RRC Connection Request. In this way, the eNodeB 11 notifies the Customized MME 22 of the new parameter.

Upon reception of the Attach Request (2), the Customized MME 22 continues a normal Attach Procedure. The Customized MME 22 holds the new parameter of the RRC Connection Request (a new Value or a new parameter of establishment Cause) received in the Attach Request (2). The parameter indicates that the UE 1 can be connected to the Customized MME indicated in the RRC Connection Request.

The UE 1 has a function of instructing the eNodeB 11 about which one of the general MME 21 and the Customized MME 22 is to be connected to the UE 1. Since the UE 1 cannot store information about all the MMEs in the core network, information indicating an MME type, a service type, or the like is used for the instruction given to the eNodeB 11, instead of an identifier by which a unique MME can be selected.

The eNodeB 11 has a function of deciding which MME is to be connected to the UE 1.

As described above, one of or a combination of User Identity, a new Value or a new parameter of a communication establishment cause (Establishment Cause), and an identifier of a part of such a parameter in the RRC Connection Request is used for selection of an MME by the eNodeB 11. Examples of the new parameter include an APN and an ID that identifies an MTC group.

As described above, in the present example, the UE instructs the eNodeB to select an MME. In response to the instruction, the eNodeB specifies the Customized MME to continue an Attach Procedure. In this way, the UE can be attached to an appropriate MME.

EXAMPLE 5

As example 5, another example with EPC will be described. In this example, the UE and the Customized MME are connected when Tracking Area Update (TA Update) is performed. In example 5, the same system configuration as that in example 1 will be used.

Figure 8:
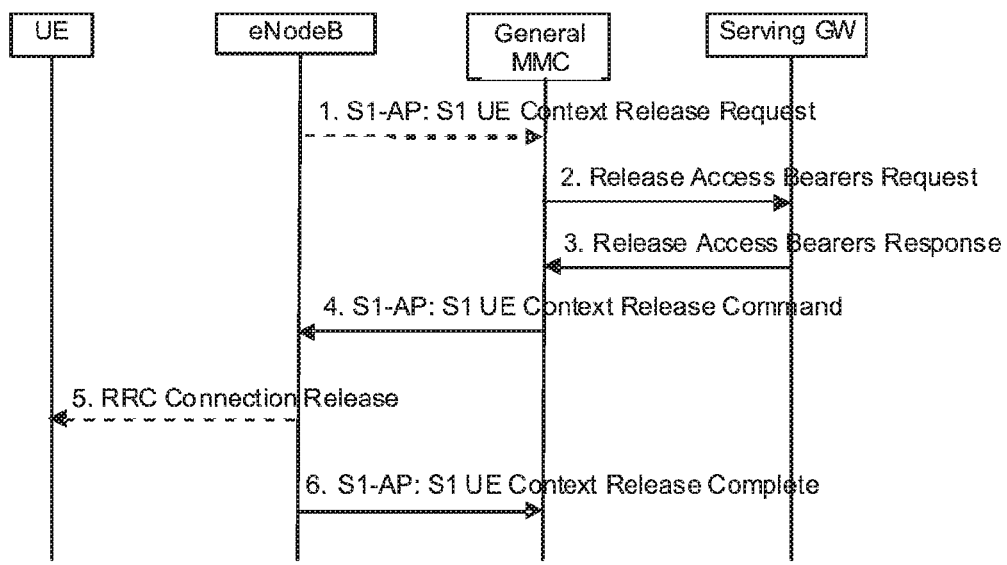
FIG. 8 illustrates an example of a sequence according to a fifth example of the present invention.
Figure 9:
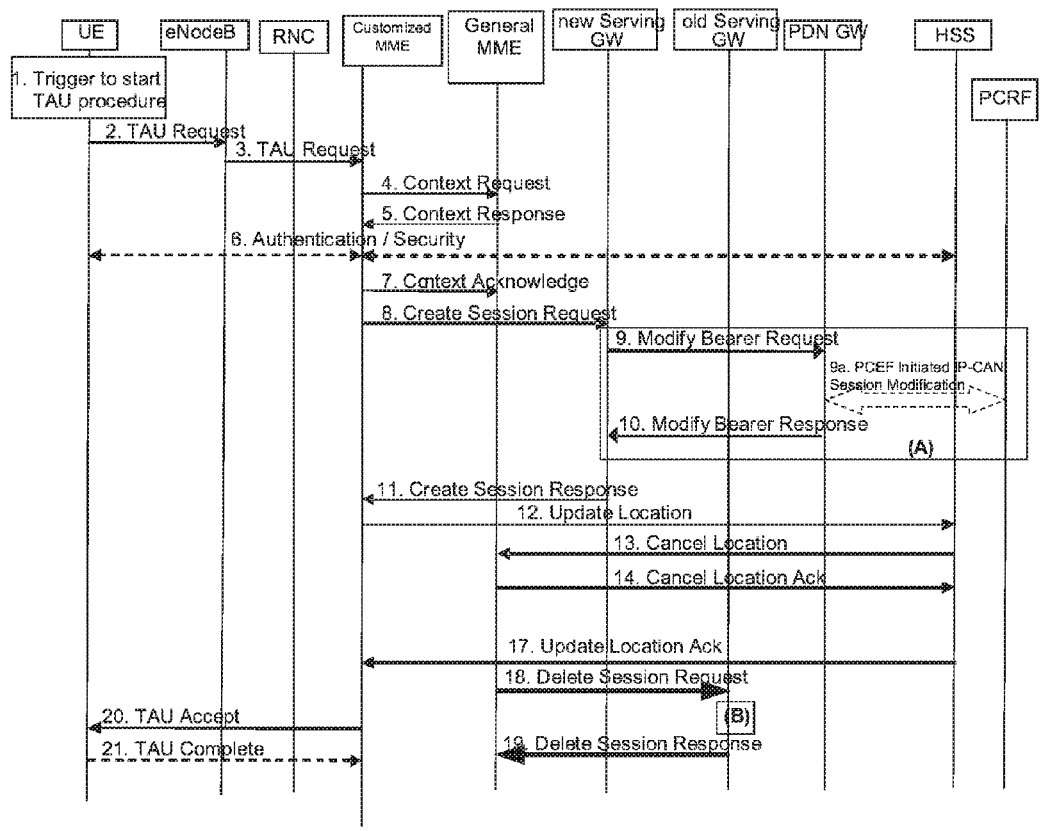
FIG. 9 illustrates an example of a sequence according to the fifth example of the present invention.

FIGS. 8 and 9 are sequence diagrams illustrating an example of an operation according to example 5. FIG. 8 is based on FIG. 5.3.5-1: S1 Release Procedure in 3GPP TS23.401 (see TS23.401 5.3.5). FIG. 9 is based on FIG. 5.3.3.1-1: Tracking Area Update procedure with Serving GW change. Reference may be made to 3GPP TS23.401 5.3.3). The operation will be described with reference to FIGS. 1, 8, and 9 (and a part in FIG. 3).

When the UE 1 transmits an Attach Request (1 in FIG. 3), first, the eNodeB 11 receives the Attach Request. The eNodeB 11 relays the Attach Request to an MME (see 2 in FIG. 3).

The eNodeB 11 cannot uniquely determine whether to forward the Attach Request to the general MME 21 or to the Customized MME 22. Thus, there is a case where the eNodeB 11 forwards the Attach Request to the general MME 21.

Upon reception of the Attach Request, the general MME 21 acquires terminal information using an Identity Request/Response (see in FIG. 3). Furthermore, the general MME 21 performs authentication and acquires a subscriber profile in coordination with the HSS 31.

The general MME 21, when acquiring the terminal information and the subscriber profile, determines whether to connect the UE 1 to the general MME 21 or to the Customized MME 22. Subsequently, a normal Attach Procedure is continued. When the general MME 21 determines that the UE 1 needs to be connected to the general MME 21, processing completes at this point.

When the general MME 21 determines that the UE 1 needs to be connected to the Customized MME 22, the general MME 21 performs S1 Release to cause the UE 1 to perform Tracking Area Update (TA Update), as illustrated in FIG. 8. The general MME 21 transmits an S1 UE context release command (4) to the eNodeB 11.

The general MME 21 gives an instruction about an MME that the eNodeB needs to select when establishing S1 Connection with an MME next time, by using an MME identifier (for example, a GUMMEI) in the S1 UE context release command (4). A parameter indicating the GUMMEI specifying the next MME to be selected by the eNodeB when S1 Release for activation of Load Balancing TAU is performed is a new parameter. Even after S1 Release is completed, while the eNodeB 11 is holding session information for the UE 1, the eNodeB 11 continues to hold the MME identifier as information for next time selection of the MME.

When S1 Release is performed, next, the UE 1 transmits a TAU Request (2), as illustrated in FIG. 9. First, the eNodeB 11 receives the TAU Request (2) from the UE 1 and forwards the TAU Request (3) to an MME. Since S1 Release has already been performed, the eNodeB 11 performs re-selection of an MME and establishes S1 Connection. The eNodeB selects the Customized MME, in accordance with the GUMMEI specified by the old MME (=the general MME) when S1 Release is performed (*the eNodeB has a function of holding the next GUMMEI per UE).

In selecting an MME, the eNodeB 11 selects the Customized MME 22 in accordance with the MME Identifier of the GUMMEI specified in the S1 UE context release command signal received from the general MME 21. Since the GUTI (GUMMEI) on NAS indicates the old MME (=general MME), context can be acquired.

Upon reception of the TAU Request (3), the Customized MME 22 continues a normal TA update procedure. The Customized MME 22 transmits a Context Request (4) to the general MME 21 and receives a Context Response (5) in response thereto.

When the S-GW is relocated, the Customized MME 22 transmits a Context Acknowledge (7) including an instruction for changing the S-GW to the general MME. When the Customized MME 22 selects a new S-GW 41 (new Serving GW), the Customized MME 22 transmits a Create Session Request (8) to the new S-GW 41.

Upon reception of this Create Session Request (8), the new S-GW 41 (new Serving GW) transmits a Modify Bearer Request (9) to the P-GW 51. Upon reception of a response to the Modify Bearer Request (9) from the P-GW 51, the new S-GW returns a Create Session Response (11) to the Customized MME 22.

The Customized MME 22 transmits an Update Location (12) to the HSS 31.

Upon reception of a Cancel Location (13) from the HSS 31, the general MME 21 deletes MM context and transmits a Cancel Location Ack (14) to the HSS 31. The HSS 31 transmits an Update Location Ack (17) in response to the Update Location (12) to the Customized MME 22.

The general MME 21 transmits a Delete Session Request (18) to the old S-GW 41 (old Serving GW), and the old S-GW 41 (old Serving GW) transmits a response (19) to the Delete Session Request (18) to the general MME 21.

The Customized MME 22 transmits a TAU Accept (20) to the UE 1.

If a GUTI is included in the TAU Accept (20), the UE 1 returns a TAU Complete (21) to the Customized MME 22. The UE 1 uses this TAU Complete (21) as an acknowledge response to the received signal TAU Accept (20).

The general MME 21 and the Customized MME 22 have a function of deciding which MME is to be connected to the UE 1. This function is the same as that in example 1.

Though not illustrated in FIGS. 8 and 9, even when an Attach Request signal is forwarded from the UE 1 that needs to be connected to the general MME 21 to the Customized MME 22, the UE 1 can be requested to re-select an MME in a like manner.

In the present example, the TA update procedure has been performed based on the sequence in FIG. 9. However, a feature in the present example is that the eNodeB 11 selects an MME. Thus, the present example can also be realized by, for example, other Procedures for re-establishing S1 Connection, such as a Service Request.

As described above, according to the present example, the general MME instructs the eNodeB to perform re-selection of an MME. In response to the instruction, the eNodeB specifies the Customized MME in selecting the MME next time to continue the Procedure. In this way, the UE can be connected to an appropriate MME.

EXEMPLARY EMBODIMENT 2

Figure 2:
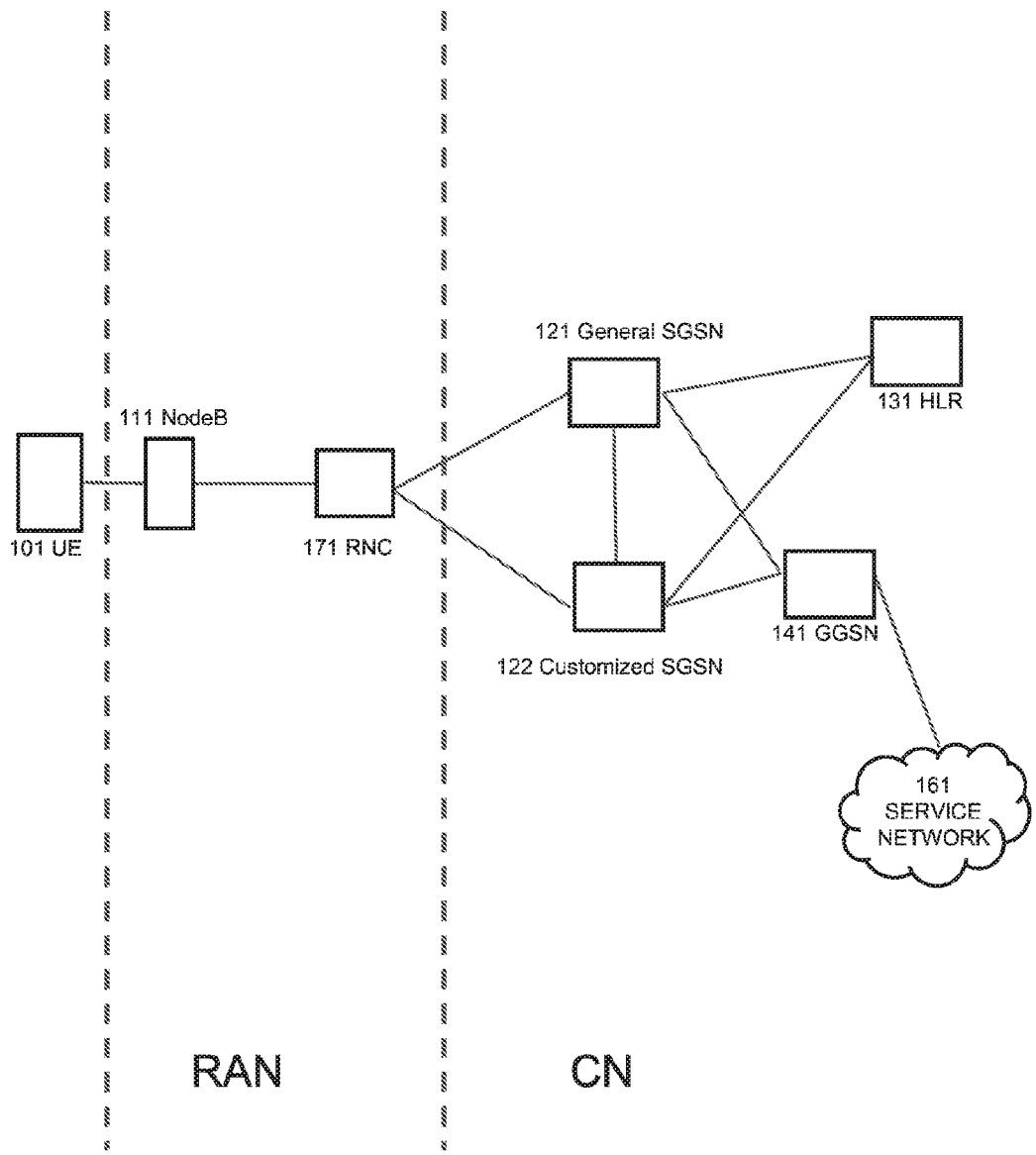
FIG. 2 illustrates an example of a system configuration according to a second exemplary embodiment of the present invention.

As exemplary embodiment 2, a configuration with UMTS (Universal Mobile Telecommunications System) will be described. In this configuration, a UE transmits an Attach Request and the UE is connected to a Customized SGSN. FIG. 2 illustrates an example of a system configuration according to exemplary embodiment 2.

A UE 101 is a portable phone terminal (mobile phone) or the like. Alternatively, the UE 101 may be the above MTC device or MBMS-compatible terminal.

A NodeB 111 and an RNC (a radio network controller) 171 are apparatuses for Radio access adopted for the UMTS system.

A general SGSN 121 and a Customized SGSN 122 are serving apparatuses used in the UMTS. Depending on the connection mode, the general SGSN 121 and the Customized SGSN 122 handle the user plane. If the SGSNs do not handle the user plane, the user plane is set between an S-GW and an RNC.

An HLR (Home Location Register) 131 is a database storing subscriber information.

A GGSN 141 (Gateway GPRS (general Packet Radio Service) Support Node: which is described as "gateway GPRS support node" in the claims) is a gateway apparatus connected to an external network. A service network 161 is an external network (data packet network).

In FIG. 2, the NodeB 111 and the RNC 171 are apparatuses in a radio access network RAN and the SGSN, the GGSN, and so forth are apparatuses in a core network.

Next, exemplary embodiment 2 will be described based on several examples. Different control methods are described in the respective examples. The following examples 6 to 10 correspond to the above Modes 6 to 10, respectively.

EXAMPLE 6

Figure 10:
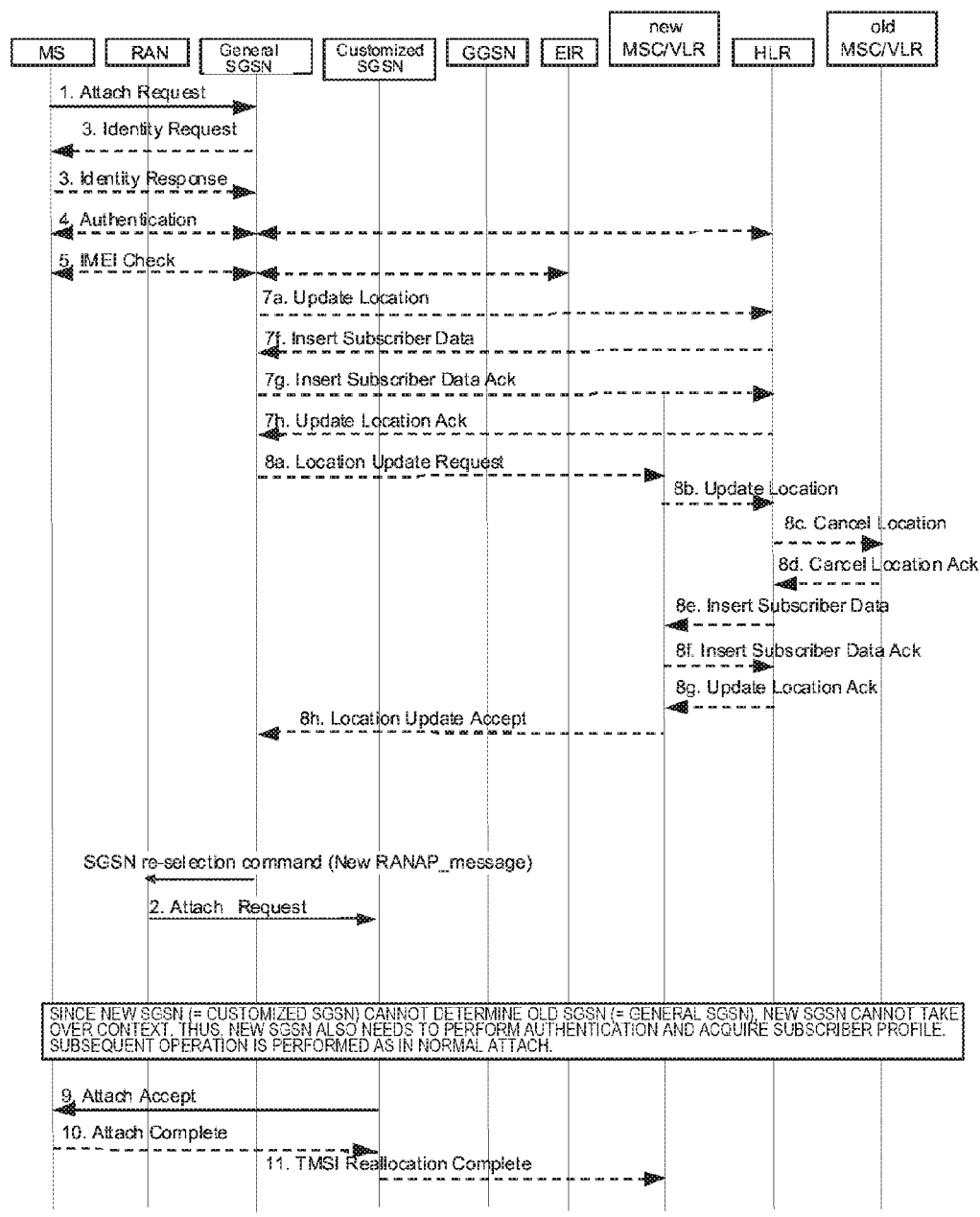
FIG. 10 illustrates an example of a sequence according to a sixth example of the present invention.
Figure 22:
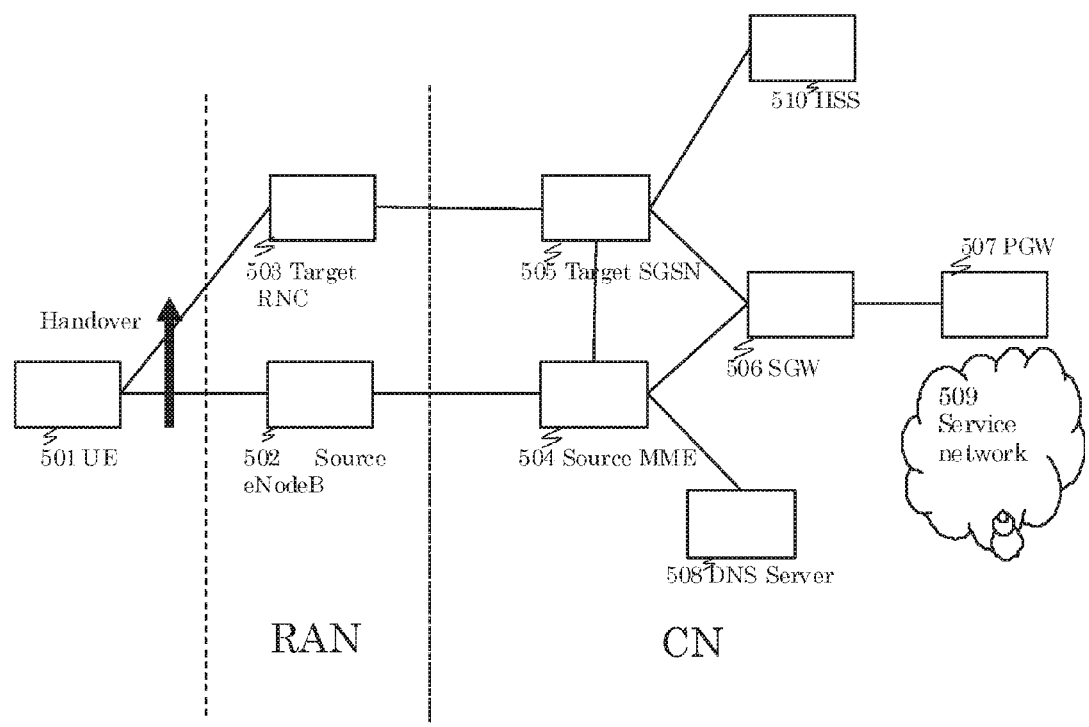
FIG. 22 illustrates an example of a system configuration according to a thirteenth example and a fourteenth example of the present invention.

FIG. 10 is a sequence diagram illustrating an operation according to example 6 and is based on 3GPP TS 23.060 6.5 FIG. 22.

In FIG. 10,
MS (Mobile Station) corresponds to the UE 101 in FIG. 2,
RAN (Radio Access Network) corresponds to the NodeB 111 and the RNC 171 in FIG. 2,
general SGSN corresponds to the general SGSN 121 in FIG. 2,
Customized SGSN corresponds to the Customized SGSN 122 in FIG. 2,
GGSN corresponds to the GGSN 141 in FIG. 2, and
HLR corresponds to the HLR 131 in FIG. 2.

A VLR of an MSC (Mobile Switching Center)/VLR (Visitor Location Register) is a location register for CS services other than the HLR. An EIR (Equipment Identifier Register) stores identifiers of valid mobile devices.

An operation will be described with reference to FIGS. 2 and 10. Hereinafter, the UE 101 in FIG. 2 will be used as the MS in FIG. 10.

When the UE 101 (MS) transmits an Attach Request (1), first, the NodeB 111 receives the Attach Request (1) and forwards the Attach Request (1) to the RNC 171. The RNC 171 forwards the Attach Request (1) to an SGSN. However, the RNC 171 cannot uniquely determine whether to forward the Attach Request to the general SGSN 121 or to the Customized SGSN 122. Thus, there is a case where the RNC 171 forwards the Attach Request to the general SGSN 121.

Upon reception of the Attach Request, the general SGSN 121 acquires terminal information using an Identity Request/ Response (3). Furthermore, the general SGSN 121 performs authentication and acquires a subscriber profile, in coordination with the HLR 131. The general SGSN 121 performs authentication and acquires a subscriber profile.

The general SGSN 121, when acquiring the terminal information and the subscriber profile, determines whether to connect the UE 101 to the general SGSN 121 or to the Customized SGSN 122. When the general SGSN 121 determines that the UE 101 needs to be connected to the general SGSN 121, the general SGSN 121 continues a normal Attach Procedure.

When the general SGSN 121 determines that the UE 101 needs to be connected to the Customized SGSN 122, in order to instruct re-selection of an SGSN, the general SGSN 121 transmits an SGSN re-selection command (an RANAP signal newly introduced in the present example) to the RNC 171. In this sequence, the general SGSN 121 sets an identifier identifying the Customized SGSN 122 in the SGSN re-selection command signal (for example, an RAI (routing area Identifier) or an NRI (Network Resource Identifier)). Namely, the general SGSN 121 embeds necessary information (RAI) for selecting the Customized SGSN 122 in an SGSN re-selection request and transmits the request to the RNC 171. If re-selection is performed within a single pool, only the NRI may be used. The SGSNs have a function of deciding whether the UE 101 is a re-selection target.

When the RNC 171 receives the SGSN re-selection command signal, in accordance with the identifier set in this signal, the RNC 171 selects the Customized SGSN 122 and forwards the Attach Request (1). Since the Customized SGSN 122 needs an NAS (Non Access Stratum) parameter of the Attach Request, the RNC 171 transmits the Attach Request. The RNC 171 has a function of storing such NAS message.

Since the new SGSN (=the Customized SGSN) cannot determine the old SGSN (=the general SGSN), the new SGSN cannot take over context. Thus, the new SGSN also needs to perform authentication and acquire the subscriber profile. Upon reception of the Attach Request (2), the Customized SGSN 122 acquires terminal information using an Identity Request/Response. Furthermore, the Customized SGSN 122 performs authentication and acquires a subscriber profile, in coordination with the HLR 131. Namely, the Customized SGSN 122 performs the same processing as that performed by the general SGSN 121.

The Customized SGSN 122, upon acquiring the terminal information and the subscriber profile, determines whether to connect the UE 101 to the general SGSN 121 or to the Customized SGSN 122. In this case, since the Customized SGSN 122 has been selected after re-selection by the RNC 171, the Customized SGSN 122 continues a normal Attach Procedure, without transmitting an SGSN re-selection command signal.

The general SGSN 121 and the Customized SGSN 122 have a function of deciding which SGSN is to be connected to the UE 101. This decision is made based on information transmitted from the UE 101. The information may be:

IMSI (International Mobile Subscriber Identity),
IMEI,
UE network capability,
MS network capability,
Mobile station classmark 2,
Mobile station classmark 3,
Device properties,
APN (Access Point Name),
ID that identifies an MTC group,
low access priority indication,
delay tolerant access,
another new parameter of a NAS signal such as an Attach Request or a TA Update Request which will be added in the future, or
an identifier of a part of such a parameter (for example, a PLMN-id included in the IMSI).

Alternatively, the above determination may be made based on information transmitted from the HLR 131. The information may be:

Feature-List,
APN,
ID that identifies an MTC group,
a new parameter of an Update Location Answer/Insert Subscriber Data Request signal which will be added in the future, or
an identifier of a part of such a parameter.

Any one of or a combination of these items of information may be used for the above determination.

Though not illustrated in FIG. 10, even when an Attach Request signal is forwarded from the UE 101 that needs to be connected to the general SGSN 121 to the Customized SGSN 122, the Customized SGSN 122 can request the RNC 171 to perform re-selection of an SGSN in a like manner.

As described above, in the present example, an SGSN instructs the RNC to perform re-selection of an SGSN. In response to the instruction, the RNC performs re-selection of an SGSN and continues the Attach Procedure. In this way, the UE can be attached to an appropriate SGSN.

EXAMPLE 7

Figure 11:
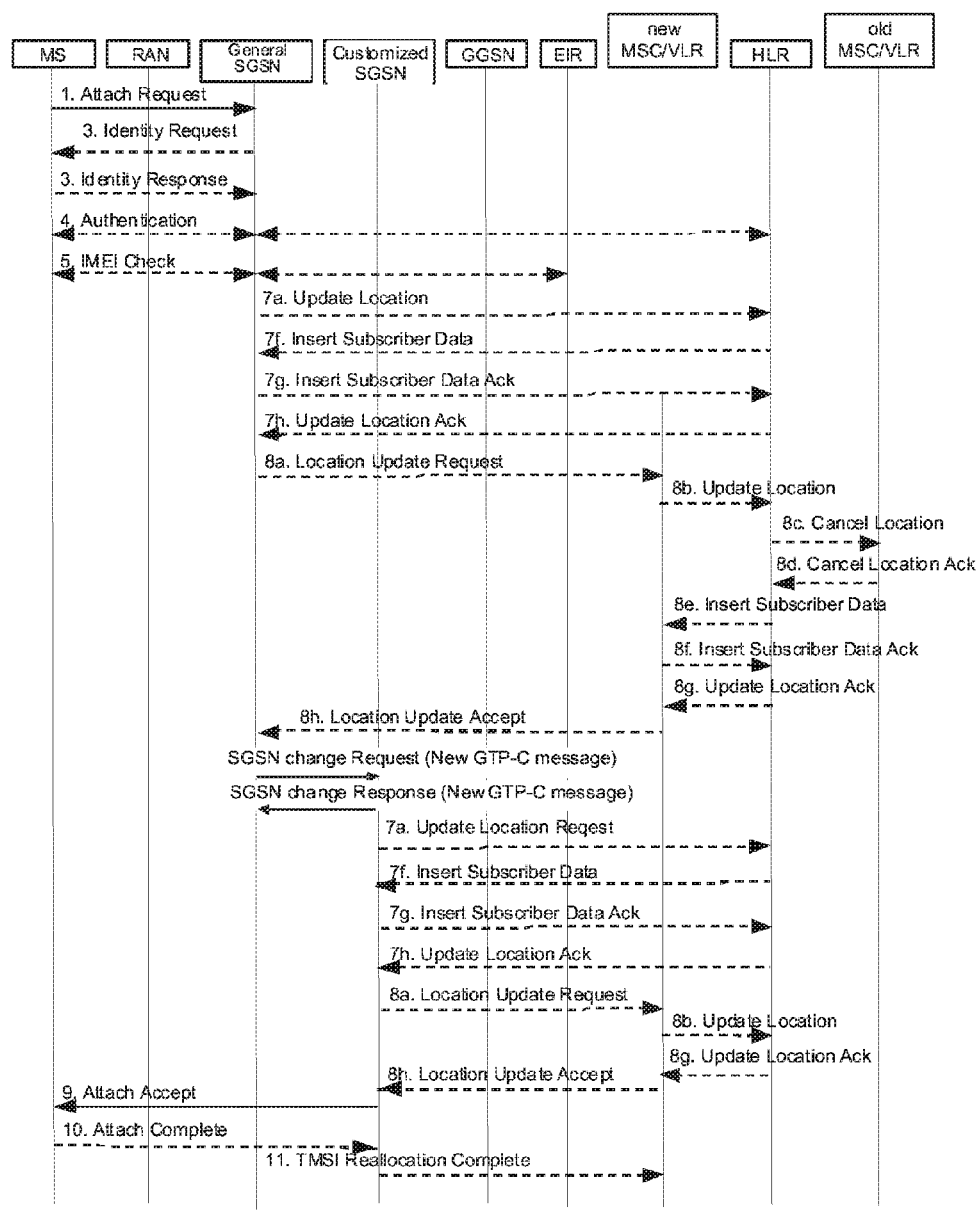
FIG. 11 illustrates an example of a sequence according to a seventh example of the present invention.

As example 7, another example with UMTS will be described. In this example, the UE transmits an Attach Request and the UE is made to connect to the Customized SGSN. In example 7, the same system configuration as that in example 6 will be used. FIG. 11 is a sequence diagram illustrating an operation according to example 7. Hereinafter, the operation will be described with reference to FIGS. 2 and 11.

When the UE 101 transmits an Attach Request (1), first, the NodeB 111 receives the Attach Request (1). Next, the NodeB 111 forwards the Attach Request to the RNC 171, and the RNC 171 forwards the Attach Request to an SGSN. However, the RNC 171 cannot uniquely determine whether to forward the Attach Request to the general SGSN 121 or to the Customized SGSN 122. Thus, there is a case where the RNC 171 forwards the Attach Request to the general SGSN 121.

Upon reception of the Attach Request, the general SGSN 121 acquires terminal information using an Identity Request/ Response. The general SGSN 121 performs, in coordination with the HLR 131, authentication and acquires a subscriber profile. Namely, in this case, at least, the general SGSN 121 performs authentication and acquires a subscriber profile.

The general SGSN 121, upon acquiring the terminal information and the subscriber profile, determines whether to connect the UE 101 to the general SGSN 121 or to the Customized SGSN 122. When the general SGSN 121 determines that the UE 101 needs to be connected to the general SGSN 121, the general SGSN 121 continues a normal Attach Procedure.

When the general SGSN 121 determines that the UE 101 needs to be connected to the Customized SGSN 122, to instruct change of an SGSN, the general SGSN 121 transmits an SGSN Change Request (a GTP signal newly introduced in the present exemplary embodiment) to the Customized SGSN 122.

In this sequence, the general SGSN 121 sets context information generated by authentication of the mobile terminal and acquisition of the subscriber profile in the SGSN Change Request signal. Namely, when the general SGSN 121 requests the Customized SGSN 122 for change of an SGSN (SGSN Change), the general SGSN 121 notifies a new SGSN (the Customized SGSN 122) of context. The SGSNs have a function of deciding whether the UE 101 is a re-selection target.

Upon reception of the SGSN Change Request signal, the Customized SGSN 122 holds the context information set in the SGSN Change Request signal and transmits an SGSN Change Response signal (a GTP signal newly introduced in the present exemplary embodiment) to the general SGSN 121.

Subsequently, the Customized SGSN 122 transmits an Update Location signal (8) to the HLR 131 to notify the HLR 131 of change of the SGSN.

If security context information transmitted from the general SGSN 121 is valid, the Customized SGSN 122 can omit performing re-authentication.

Subsequently, the Customized SGSN 122 continues the Attach Procedure and the RNC 171 receives an Attach Accept signal (9) from the Customized SGSN 122. Subsequently, a normal Attach Procedure is continued.

The general SGSN 121 and the Customized SGSN 122 have a function of deciding which SGSN is to be connected to the UE 101, as is the case with example 6.

Though not illustrated in FIG. 11, even when an Attach Request signal is forwarded from the UE 101 that needs to be connected to the general SGSN 121 to the Customized SGSN 122, the Customized SGSN 122 can request the general SGSN 121 for change of an SGSN in a like manner.

As described above, in the present example, the general SGSN instructs the Customized SGSN about change of an SGSN. In response to the instruction, the Customized SGSN performs the change of an SGSN and continues the Attach Procedure. In this way, the UE can be attached to an appropriate SGSN.

EXAMPLE 8

Figure 12:
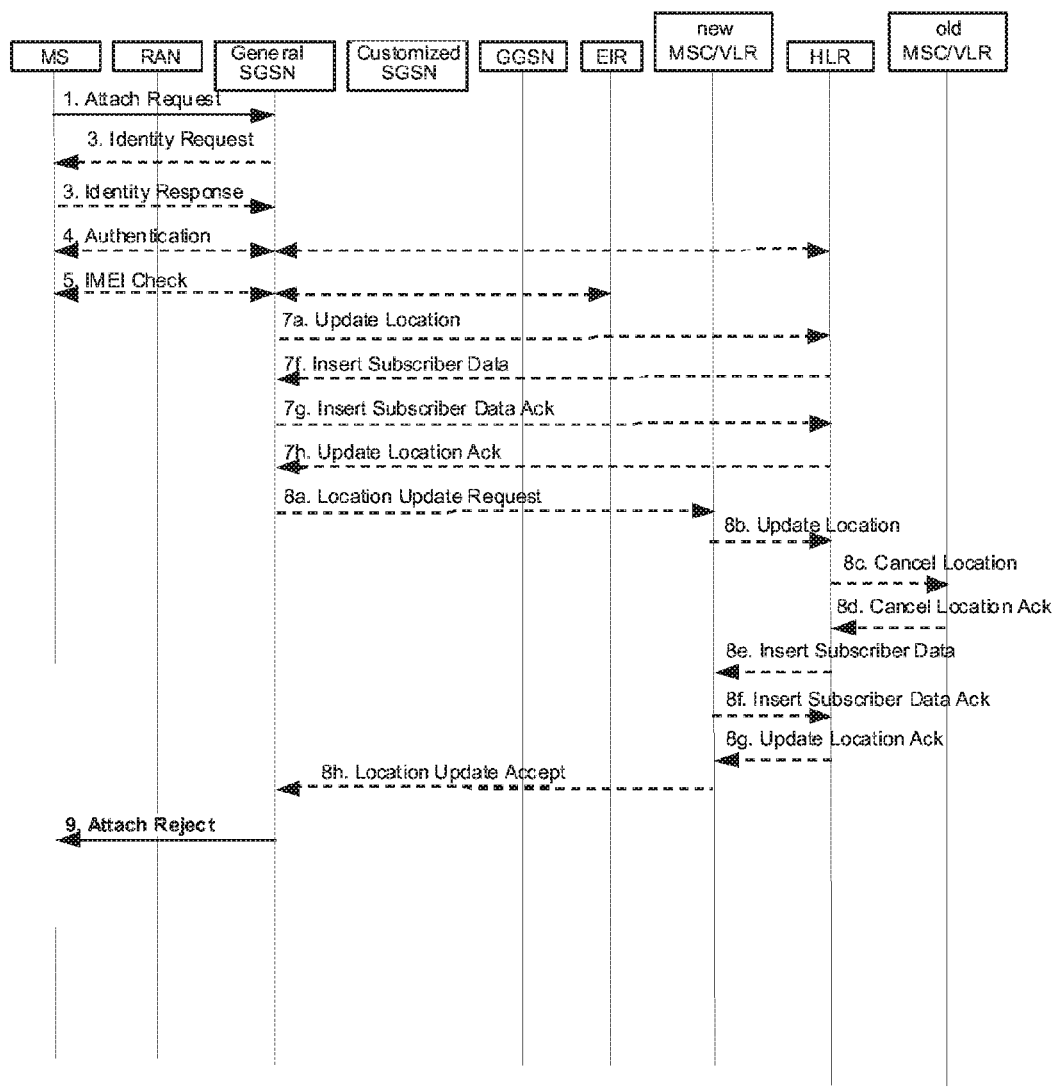
FIG. 12 illustrates an example of a sequence according to an eighth example of the present invention.
Figure 13:
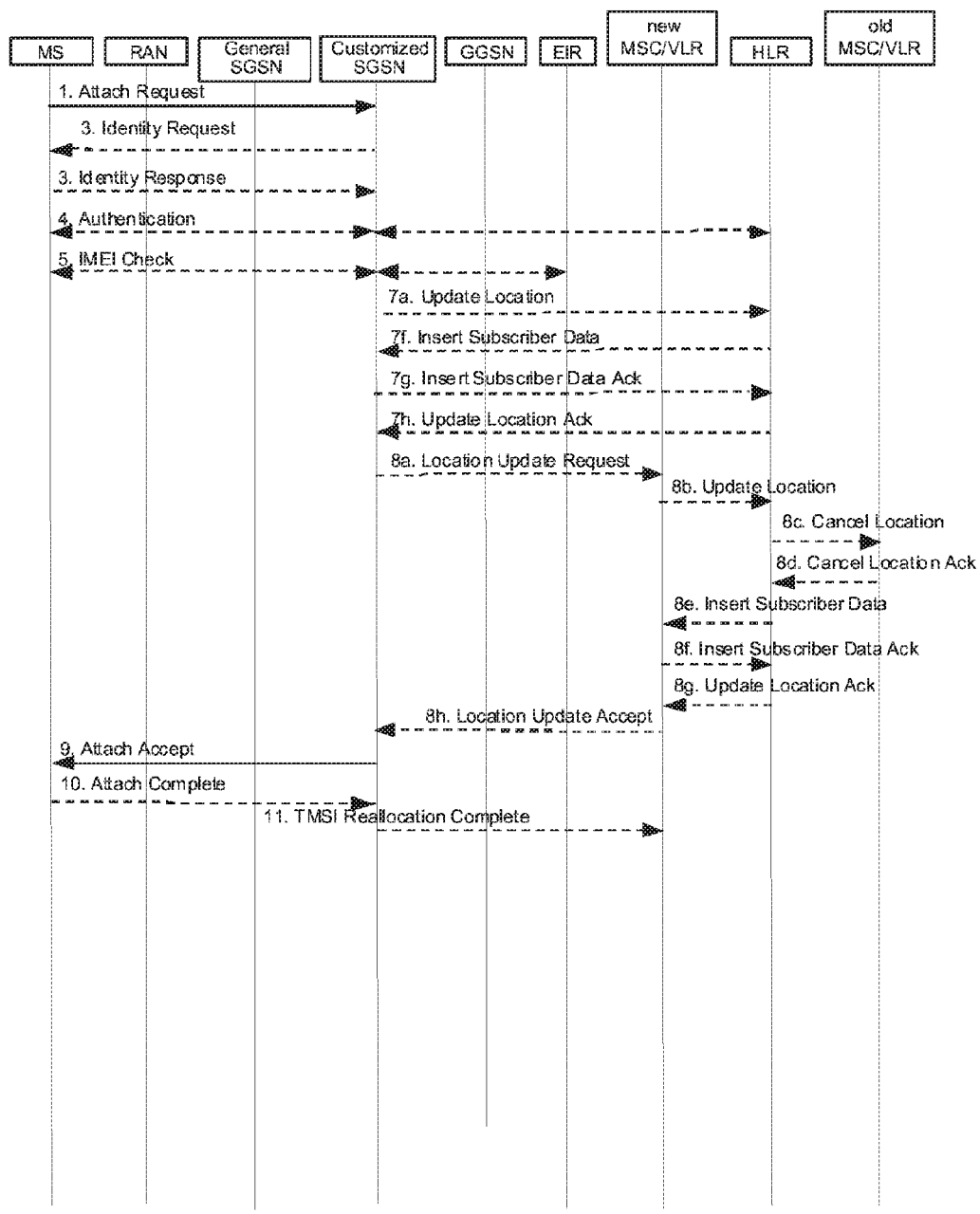
FIG. 13 illustrates an example of a sequence according to the eighth example of the present invention.

As example 8, another example with UMTS will be described. In this example, the UE transmits an Attach Request and the UE is made to connect to the Customized SGSN. In example 8, the same configuration as that in example 6 will be used. FIGS. 12 and 13 are sequence diagrams illustrating an operation according to example 8. Hereinafter, the operation will be described with reference to FIGS. 2, 12, and 13.

When the UE 101 (MS) transmits an Attach Request (1), first, the NodeB 111 receives the Attach Request (1). Next, the NodeB 111 forwards the Attach Request to the RNC 171, and the RNC 171 forwards the Attach Request to an SGSN. However, the RNC 171 cannot uniquely determine whether to forward the Attach Request to the general SGSN 121 or to the Customized SGSN 122. Thus, there is a case where the RNC 171 forwards the Attach Request to the general SGSN 121.

Upon reception of the Attach Request (1), the general SGSN 121 acquires terminal information using an Identity Request/Response (3). The general SGSN 121 performs, in coordination with the HLR 131, authentication and acquires a subscriber profile.

Upon acquiring the terminal information and the subscriber profile, the general SGSN 121 determines whether to connect the UE 101 to the general SGSN 121 or to the Customized SGSN 122. When the general SGSN 121 determines that the UE 101 needs to be connected to the general SGSN 121, the general SGSN 121 continues a normal Attach Procedure.

When the general SGSN 121 determines that the UE 101 needs to be connected to the Customized SGSN 122, the general SGSN 121 transmits an Attach Reject signal (9) to the UE 101, instead of continuing the Attach Procedure.

In this case, the general SGSN 121 sets one or more parameters for instructing re-attach and an RAI (routing area Identity) parameter (a parameter newly introduced in the present exemplary embodiment) in the Attach Reject signal, so that the RNC 171 can select the Customized SGSN 122 when performing re-attach. While these parameters are parameters that are newly introduced in the present example, since the RNC 171 is transparent, the RNC 171 is not affected.

The UE 101 needs to have a function of receiving an RAI via an Attach Reject and using the RAI specified in the Attach Reject when transmitting a Re-attach. The SGSNs have a function of deciding whether the UE 101 is a re-selection target.

Upon reception of the Attach Reject signal (9), as illustrated in FIG. 13, the UE 101 transmits the Attach Request signal (1), in which the RAI is set, to the RNC 171, in accordance with the parameter for instructing re-attach set in the Attach Reject signal (9) and the RAI parameter (re-attach by a P-TMSI (Packet Temporary Mobile Subscriber Identifier)). The RNC 171 determines an appropriate SGSN from the RAI and forwards the Attach Request to the Customized SGSN 122.

Subsequently, the Customized SGSN 122 continues a normal Attach Procedure.

While the RAI is set in the attach request, the Customized SGSN 122 does not hold context information. Thus, upon reception of the Attach Request signal (1), the Customized SGSN 122 acquires terminal information using an Identity Request/Response (3). Furthermore, the Customized SGSN 122 performs authentication and acquires a subscriber profile in coordination with the HLR 131.

The general SGSN 121 and the Customized SGSN 122 have a function of deciding which SGSN is to be connected to the UE 101, as is the case with example 6.

Though not illustrated in FIGS. 12 and 13, even when an Attach Request signal is forwarded from the UE 101 that needs to be connected to the general SGSN 121 to the Customized SGSN 122, the Customized SGSN 122 can request the UE 101 for re-selection of an SGSN in a like manner.

As described above, in the present example, the general SGSN instructs the UE to perform re-selection of an SGSN. In response to the instruction, the UE specifies the Customized SGSN to continue an Attach Procedure. In this way, the UE can be attached to an appropriate SGSN.

EXAMPLE 9

Figure 14:
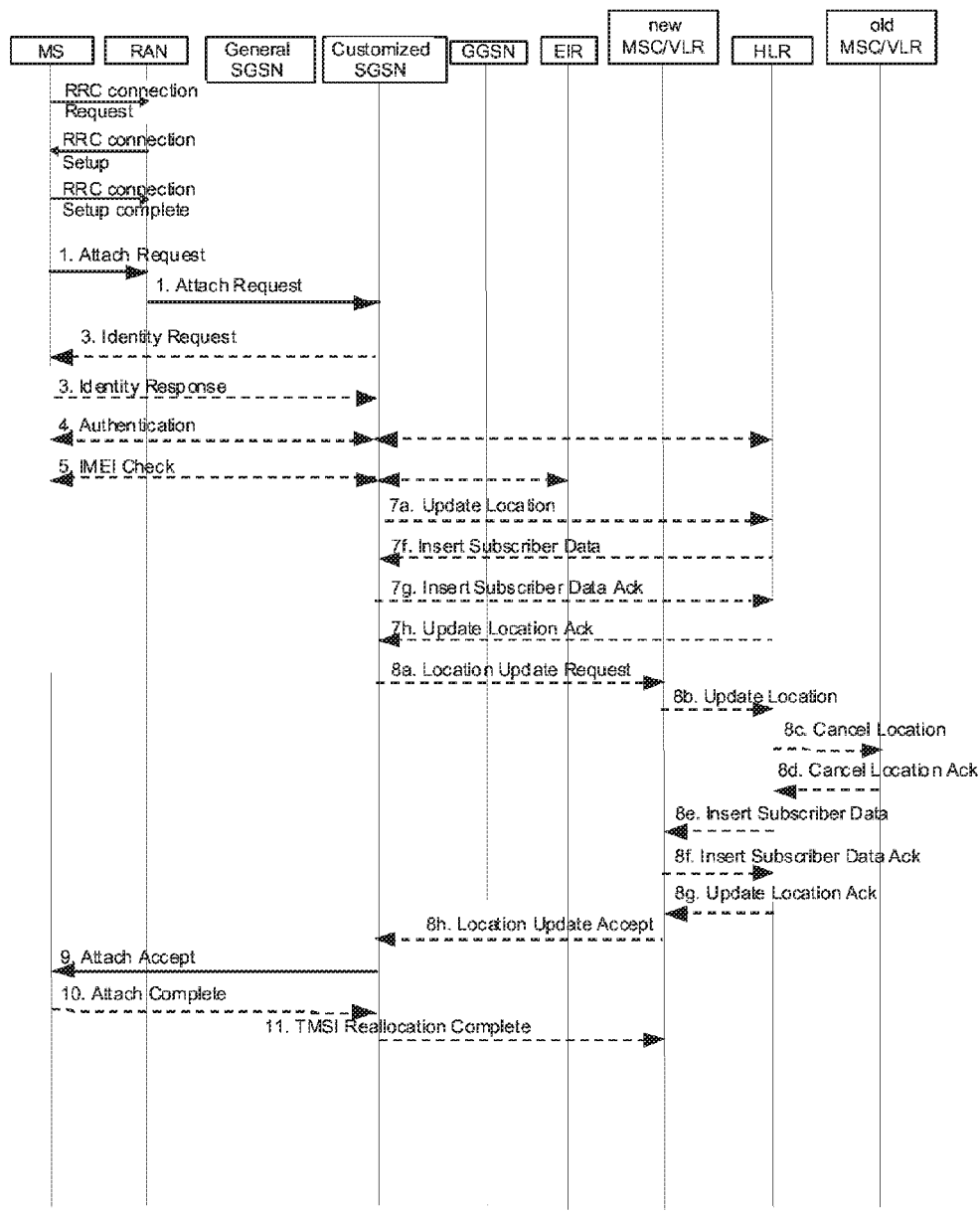
FIG. 14 illustrates an example of a sequence according to a ninth example of the present invention.

As example 9, another example with UMTS will be described. In this example, the UE transmits an Attach Request and the UE is made to connect to the Customized SGSN. In example 6, the same system configuration as that in example 6 will be used. FIG. 14 is a sequence diagram illustrating an example of an operation according to example 9. Hereinafter, the operation will be described with reference to FIGS. 2 and 14.

To transmit an Attach Request to an SGSN, first, the UE 101 establishes RRC Connection with the RNC 171. To establish RRC Connection, first, the UE 101 transmits an RRC Connection Request signal to the RNC 171.

In this signal, the UE 101 sets one or more parameters indicating that the UE 101 needs to be connected to the Customized SGSN 122 (User Identity, a new Value or a new parameter of Establishment Cause (a value or a parameter newly introduced in the present example), or an identifier of a part of such a parameter (a PLMN-id included in the IMSI, for example)).

Upon reception of the RRC Connection Request signal, the RNC 171 stores information indicating that the UE 101 needs to be connected to the Customized SGSN 122 and continues the subsequent RRC Connection Procedure.

After establishing RRC Connection, the UE 101 transmits an Attach Request (1) and the NodeB 111 receives the Attach Request (1). Next, the NodeB 111 forwards the Attach Request to the RNC 171.

The RNC 171 forwards the Attach Request to an SGSN. From the information stored when the RNC 171 has received the RRC Connection Request signal, the RNC 171 forwards the Attach Request signal to the Customized SGSN 122. The RNC 171 sets one or more parameters indicating that the UE 101 needs to be connected to the Customized SGSN 122 (User Identity, a new Value or a new parameter of Establishment Cause (a value or a parameter newly introduced in the present example), or an identifier of a part of such a parameter (a PLMN-id included in the IMSI, for example)) received via the RRC Connection Request signal in the Attach Request and notifies the Customized SGSN 122 of the information.

Upon reception of the Attach Request, the Customized SGSN 122 continues a normal Attach Procedure. The Customized SGSN 122 holds the parameter indicating that the UE 101 needs to be connected to the Customized SGSN 122 received via the Attach Request (the parameter received by the RNC 171 via the RRC Connection Request such as User Identity, a new Value or a new parameter of Establishment Cause (a value or a parameter newly introduced in the present example), or an identifier of a part of such a parameter (a PLMN-id included in the IMSI, for example).

The UE 101 has a function of instructing the RNC 171 about which one of the general SGSN 121 and the Customized SGSN 122 is to be connected to the UE 101. However, at this time, the UE 101 cannot store information about all the SGSNs in the core network, and information indicating an SGSN type, a service type, or the like is used for the instruction given to the RNC 171, instead of an identifier by which a unique SGSN can be selected.

The RNC 171 has a function of deciding which SGSN is to be connected to the UE 101. For this decision, as described above, one of or a combination of User Identity, a new Value or a new parameter of Establishment Cause (a value or a parameter newly introduced in the present example), and an identifier of a part of such a parameter is used. Examples of the new parameter include an ID that identifies an MTC group and an APN.

As described above, in the present example, the UE 101 instructs the RNC 171 to select an SGSN. In response to the instruction, the RNC 171 specifies the Customized SGSN to continue an Attach Procedure is continued. In this way, the UE 101 can be attached to an appropriate SGSN.

EXAMPLE 10

Figure 15:
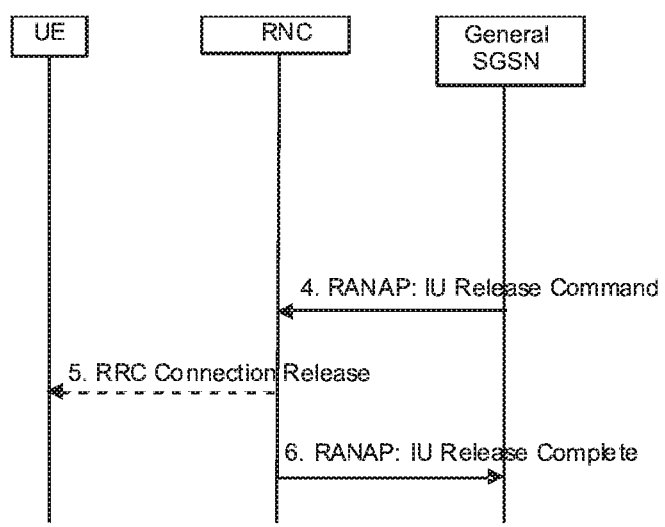
FIG. 15 illustrates an example of a sequence according to a tenth example of the present invention.
Figure 16:
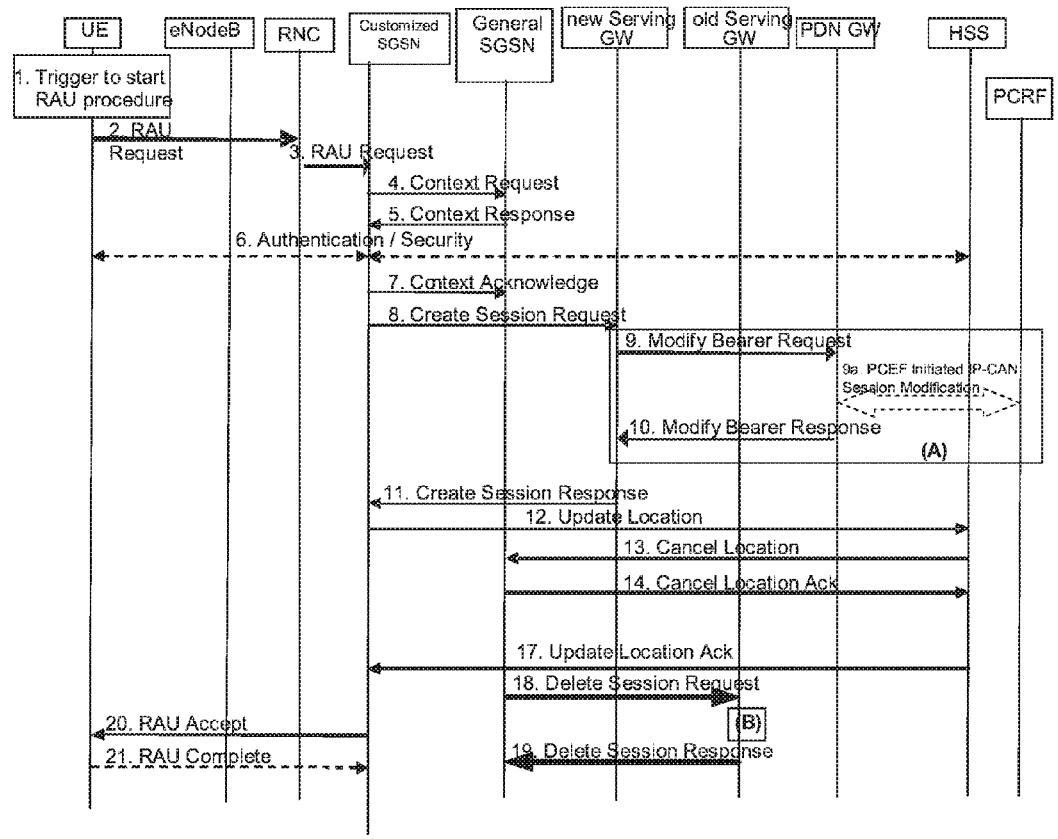
FIG. 16 illustrates an example of a sequence according to the tenth example of the present invention.

As example 10, another example with UMTS will be described. In this example, the UE and the Customized SGSN are connected when RA Update is performed. In example 10, the same system configuration as that in example 6 will be used. FIGS. 15 and 16 are sequence diagrams illustrating an example of an operation according to example 10. Hereinafter, the operation will be described with reference to FIGS. 2, 15, 16, and a part of FIG. 10.

When the UE 101 transmits an Attach Request (see 1 in FIG. 10), first, the NodeB 111 receives the Attach Request. The NodeB 111 forwards the Attach Request to the RNC 171, and the RNC 171 forwards the Attach Request to an SGSN. However, the RNC 171 cannot uniquely determine whether to forward the Attach Request to the general SGSN 121 or to the Customized SGSN 122. Thus, there is a case where the RNC 171 forwards the Attach Request to the general SGSN 121.

Upon reception of the Attach Request, the general SGSN 121 acquires terminal information using an Identity Request/Response (see 3 in FIG. 10). The general SGSN 121 performs authentication and acquires a subscriber profile in coordination with the HLR 131.

Upon acquiring the terminal information and the subscriber profile, the general SGSN 121 determines whether to connect the UE 101 to the general SGSN 121 or to the Customized SGSN 122. When the general SGSN 121 determines that the UE 101 needs to be connected to the general SGSN 121, the general SGSN 121 continues a normal Attach Procedure.

When the general SGSN 121 determines that the UE 101 needs to be connected to the Customized SGSN 122, the general SGSN 121 performs Iu release to cause the UE 101 to perform RA (routing area) update, as illustrated in FIG. 15.

The general SGSN 121 transmits an IU release command signal to the RNC 171 (see 4 in FIG. 15). The general SGSN 121 gives an instruction about an SGSN that the RNC needs to select when establishing Iu Connection with an SGSN next time, by using an SGSN identifier (for example, an RAI or an NRI) in the IU release command signal. In the case of a single pool, the NRI may be used.

Even after Iu release is completed, while the RNC 171 is holding session information for the UE 101, the RNC 171 continues to hold the SGSN identifier as information for next time selection of the SGSN.

After Iu release is performed (after the RNC 171 transmits IU release complete (6) to the general SGSN 121), next, as illustrated in FIG. 16, the UE 101 transmits an RAU request (RA update request) (2).

First, the NodeB 111 receives the RAU Request (2), and the NodeB 111 forwards the RAU Request (3) to the RNC 171.

Next, the RNC 171 forwards the RAU request (3) to an SGSN. Since Iu release has already been performed, the RNC 171 performs selection of an SGSN and establishes Iu connection.

In selecting an SGSN, the RNC 171 selects the Customized SGSN 122 in accordance with the SGSN Identifier specified in the Iu release command signal received from the general SGSN 121. The RNC selects the Customized SGSN in accordance with the RAI (or the NRI) instructed by the old SGSN (=the general SGSN) when Iu release is performed. The RNC has a function of holding the next RAI per UE.

Upon reception of the RAU request, the Customized SGSN 122 continues a normal RA Update Procedure. Since the P-TMSI (RAI) on the NAS indicates the general SGSN, which is the old SGSN, the Customized SGSN 122 acquires context.

The general SGSN 121 and the Customized SGSN 122 have a function of deciding which SGSN is to be connected to the UE 101. This function is the same as that in example 6.

Though not illustrated in FIGS. 15 and 16, even when an Attach Request signal is forwarded from the UE 101 that needs to be connected to the general SGSN 121 to the Customized SGSN 122, the Customized SGSN 122 can request the UE 101 to perform re-selection of an SGSN in a like manner.

In the present example, the RA Update Procedure is used in the sequences in FIG. 16. However, since this Procedure is used for selecting an SGSN by the RNC 171, another Procedure for re-establishing Iu Connection, such as PDP Context Activation, may be used.

As described above, according to the present example, the general SGSN instructs the RNC to perform re-selection of an SGSN. In response to the instruction, the RNC specifies the Customized SGSN in selecting an SGSN next time and continues the Procedure. In this way, the UE can be connected to an appropriate SGSN.

EXAMPLE 11

Figure 17:
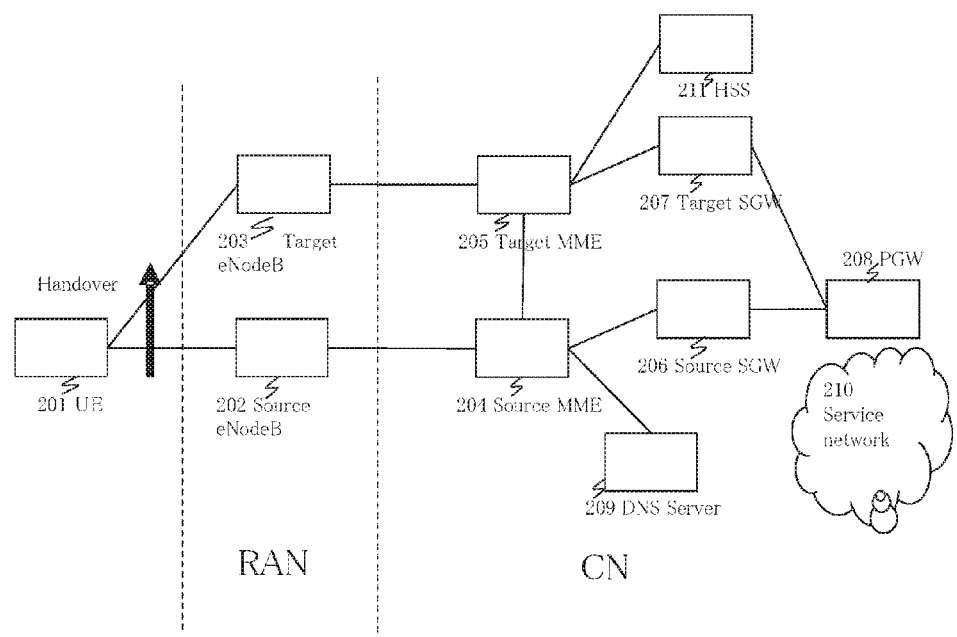
FIG. 17 illustrates an example of a system configuration according to an eleventh example of the present invention.
Figure 18:
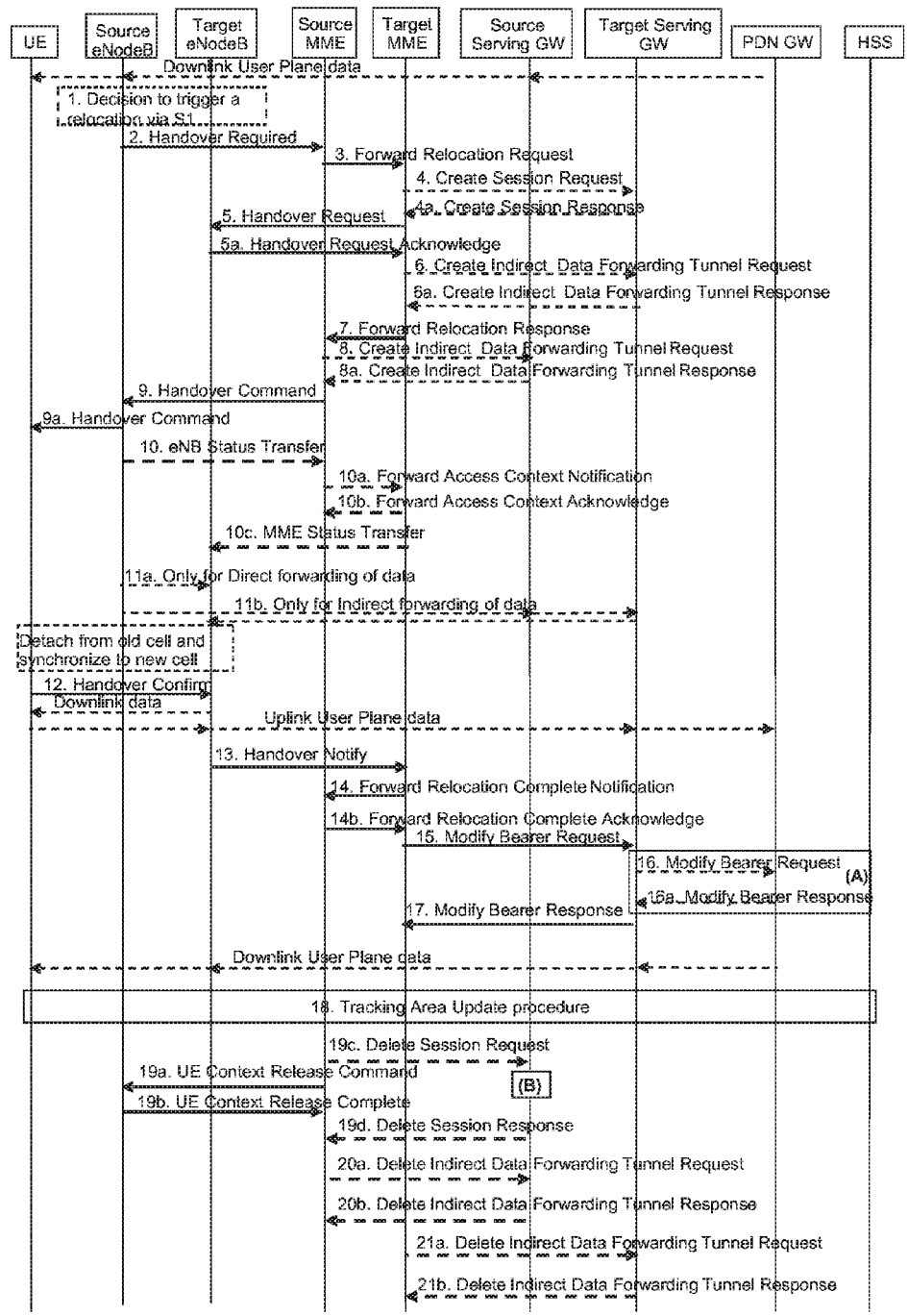
FIG. 18 illustrates an example of a sequence according to the eleventh example of the present invention.

As example 11, an example of a handover between Customized MMEs in EPC will be described. FIG. 17 illustrates an example of a configuration (system configuration) according to example 11. As illustrated in FIG. 17, the configuration includes a UE 201 and a handover-Source eNodeB (Source eNodeB) 202 and a handover destination Target eNodeB (target eNodeB) 203 in the RAN (radio access network) to which the UE 201 is wirelessly connected. The CN (core network) includes a Source MME 204, a Target MME 205, a Source SGW 206, a Target SGW 207, a DNS server 209, an HSS 211, and a PGW 208 connected to a service network 210. In this example, both the handover Source MME 204 and the Target MME 205 are Customized MMEs. FIG. 18 is a sequence diagram illustrating an example of an operation (a sequence operation) according to example 11. FIG. 18 is based on FIG. 5.5.1.2.2-1: S1-based handover in 3GPP TS23.401, and the sequence numbers are in accordance with this figure. As for details of each sequence, reference may be made to description of TS23.401 5.5.1.2.2. Hereinafter, the operation will be described with reference to FIGS. 17 and 18.

When the handover-Source eNodeB 202 detects deterioration of a signal used for connection to the UE 201, the handover-Source eNodeB 202 transmits a Handover Required (2) to the Source MME 204. Information such as a Target TAI (Tracking Area Identity) is included in the Handover Required (2). The Source MME 204 refers to the information and determines execution of an inter-MME handover to the Target MME 205.

In this example, in selecting the Target MME 205, the Source MME 204 uses information of a customized MME connection request held therein. The information of a customized MME connection request held in the Source MME 204 will be described. First, the eNodeB 202 receives from the UE 201 an RRC signal to which information of a customized MME connection request for connecting to a Customized MME is added. Next, the eNodeB 202 notifies the Source MME 204, which is the Customized MME, of the information of a customized MME connection request via an S1-AP signal or the like. The information of a customized MME connection request is held in the Source MME 204.

In selecting the Target MME 205 (MME that is a handover destination), the Source MME 204 may use a local configuration held in the Source MME 204, based on the information of a customized MME connection request held in the Source MME 204. For example, the local configuration is set by an operator and is information (configuration information) internally managed and held by the apparatus (MME) (for example, the configuration information includes information based on an MTC group and a handover destination mobility area, the information used when an MTC subscriber (MTC terminal) performs a handover). For example, when the information of a customized MME connection request is an APN (Access Point Name), the Source MME 204 refers to the APN and uses local information (local configuration) that corresponds to the value of LAPI (Low Access Priority Indication) to select an MME that is a handover destination. Alternatively, the Source MME 204 may use a local configuration held therein to select the Target MME 205.

The Source MME 204 may select the Target MME 205 by setting the information of the Customized MME connection request along with location information such as a target TAI (Tracking Area Identity) and issuing "DNS Query" to the DNS server 209.

When the Source MME 204 determines execution of an Inter-MME handover to the Target MME 205, the Source MME 204 transmits a Forward Relocation Request (3) to the Target MME 205. In this operation, the Source MME 204 may set the information of a customized MME connection request held therein in the Forward Relocation Request (3).

When the Target MME 205 executes another Inter-MME handover, the Target MME 205 can select a Customized MME by using the information of a customized MME connection request held therein.

For the subsequent sequence, Inter-MME handover processing may be performed in accordance with related technology.

EXAMPLE 12

Figure 19:
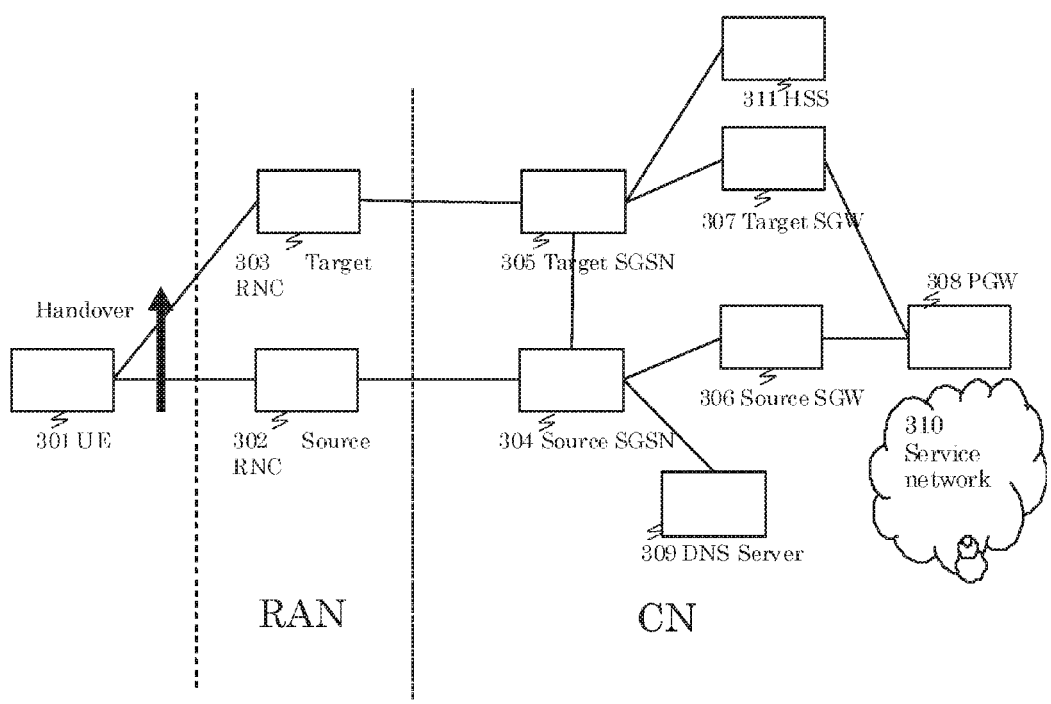
FIG. 19 illustrates an example of a system configuration according to a twelfth example of the present invention.
Figure 20:
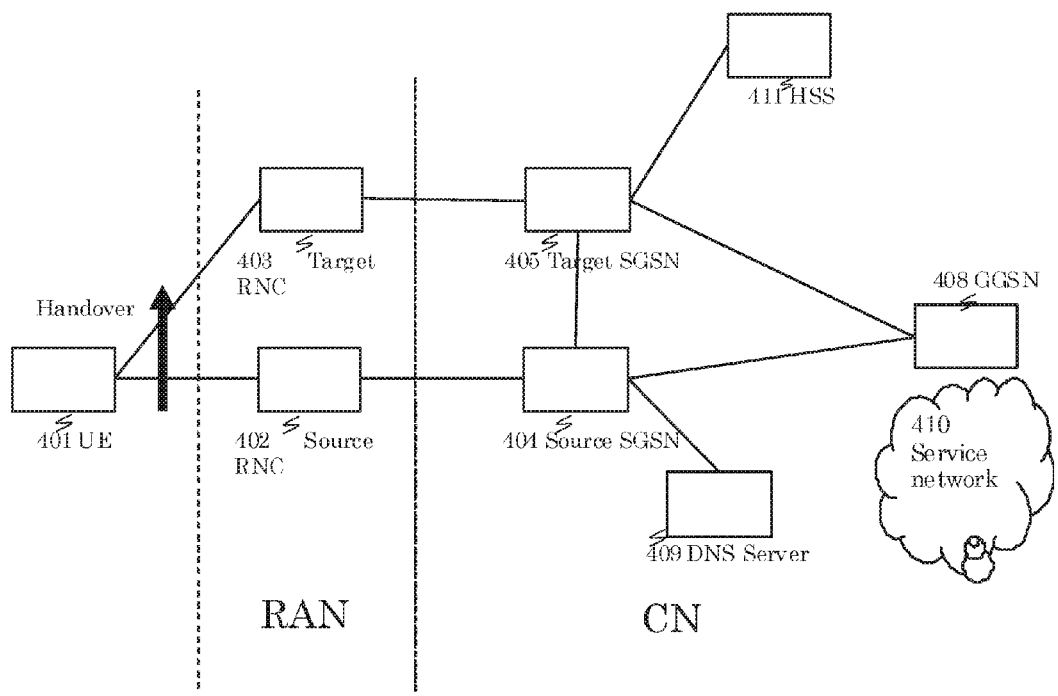
FIG. 20 illustrates an example of a system configuration according to the twelfth example of the present invention.
Figure 21:
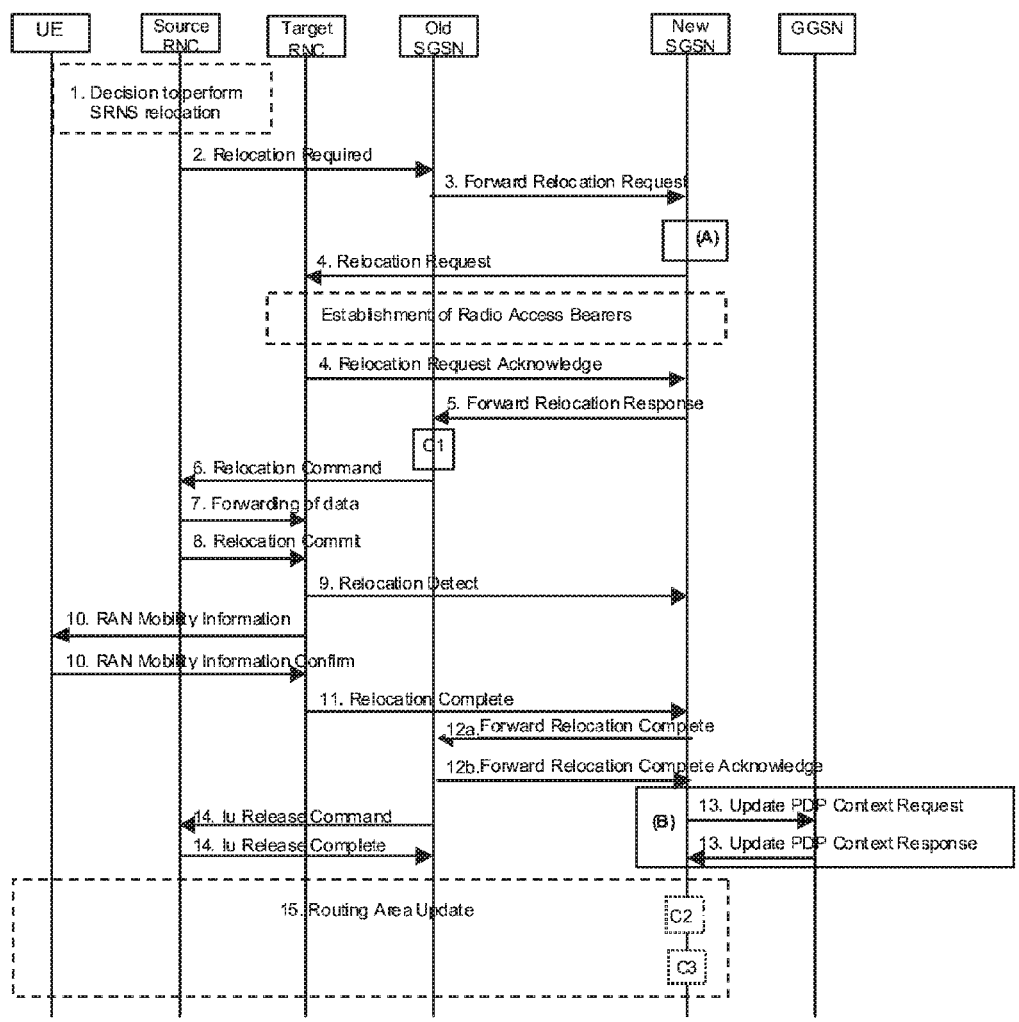
FIG. 21 illustrates an example of a sequence according to the twelfth example of the present invention.

As example 12, an example of an SRNS (Serving Radio Network Subsystem) relocation (handover) between Customized SGSNs in UMTS will be described. FIGS. 19 and 20 illustrate example 12. FIG. 21 is a sequence diagram illustrating an example of an operation according to example 12.

As illustrated in FIG. 19, the configuration includes a UE 301 and a handover-Source RNC 302 and a handover destination Target RNC 303 in the RAN (radio access network) to which the UE 301 is wirelessly connected. The CN (Core Network) includes a Source SGSN 304, a Target SGSN 305, a Source SGW 306, a Target SGW 307, a DNS server 309, an HSS 311, and a PGW 308. The UE 301 is connected to a service network 310 via the PGW 308. In this example, both the handover-Source SGSN 304 and the Target SGSN 305 are Customized SGSNs. FIG. 21 is based on FIG. 39: SRNS Relocation Procedure in 3GPP TS23.060, and the sequence numbers are in accordance with this figure. As for details of each sequence, reference may be made to the description of 3GPP TS23.060 6.9.2.2.1 (while a terminal is denoted by MS (Mobile Station) in FIG. 39 of 3GPP TS23.060, the terminal is denoted by UE in FIG. 21).

Hereinafter, the operation will be described with reference to FIGS. 20 and 21. FIG. 19 illustrates an example in which the CN is configured by EPC. Since no particular difference is seen as to the operation according to example 12, the operation according to the present example is effective with the configuration illustrated in FIGS. 19 and 20. The CN in FIG. 20 is different from the CN in FIG. 19 in that the Source SGW 306 and the Target SGW 307 are not included and that a GGSN 408 is included in place of the PGW 308 in FIG. 19.

For example, when the Source RNC 402 detects deterioration of a signal used for connection to the UE 401, the Source RNC 402 transmits a relocation required (2) to the Source SGSN 404. Information such as a target ID is included in the relocation required (2). The Source SGSN 404 refers to the information and determines execution of an inter-SGSN SRNS (Serving Radio Network Subsystem) relocation to the Target SGSN 405.

In this example, in selecting the Target SGSN 405, the Source SGSN 404 uses the information of a customized-SGSN connection request held therein. The information of a customized SGSN connection request held in the Source SGSN 404 will be described. First, the RNC 403 receives from the UE 401 an RRC (Radio Resource Control) signal to which information of a customized-SGSN connection request for connecting to a Customized SGSN is added. Next, the RNC 403 notifies the Source SGSN 404, which is the Customized SGSN, of the information of a customized SGSN connection request via an Iu signal. The information of a customized MME connection request is held in the Source SGSN 404. In selecting the Target SGSN 405, the Source SGSN 404 may use a local configuration, based on the information of a customized SGSN connection request held in the Source SGSN 404. Alternatively, the Source SGSN 404 may use a local configuration held therein to select the Target SGSN 405. The Source SGSN 404 may select the Target SGSN 405 by setting the information of a customized SGSN connection request along with location information such as a target ID and issuing "DNS Query" to the DNS server 409.

When the Source SGSN 404 determines execution of an inter-SGSN SRNS relocation to the Target SGSN 405, the Source SGSN 404 transmits a Forward Relocation Request (3) to the Target SGSN 405. The Source SGSN 404 may set the information of a customized SGSN connection request held therein in this signal (forward relocation request).

When the Target SGSN 405 executes another inter-SGSN SRNS relocation, the Target SGSN 405 can select a Customized SGSN by using the information of a customized-SGSN connection request.

For the subsequent sequence, inter-SGSN SRNS relocation processing is performed in accordance with related technology.

EXAMPLE 13

Figure 23:
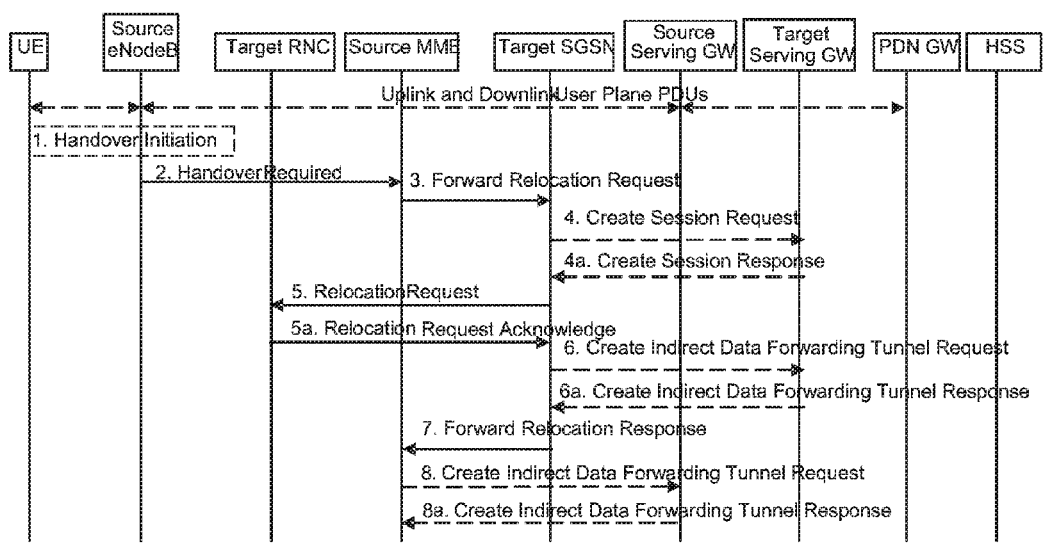
FIG. 23 illustrates an example of a sequence according to the thirteenth and fourteenth examples of the present invention.

As example 13, an example of a handover from a Customized MME to a Customized SGSN in EPC will be described. FIG. 22 illustrates an example of a configuration according to example 13. As illustrated in FIG. 22, the configuration includes a UE 501 and a Source eNodeB 502 and a Target eNodeB 503 in the RAN (radio access network) to which the UE 501 is wirelessly connected. The CN (core network) includes a Source MME 504, a Target SGSN 505, an SGW 506, a DNS server 508, an HSS 510, and a PGW 507 connected to a service network 509. FIG. 23 is a sequence diagram illustrating an example of an operation according to example 13. FIG. 23 is based on FIG. 5.5.2.1.2-2: E-UTRAN to UTRAN Iu mode Inter RAT HO, preparation phase in 3GPP TS23.401, and the sequence numbers are in accordance with this figure. As for details of each sequence, reference may be made to description of TS23.401 5.5.2.1.2.

Hereinafter, the operation will be described with reference to FIGS. 22 and 23. When the Source eNodeB 502 detects deterioration of a signal used for connection to the UE 501, the Source eNodeB 502 transmits a Handover Required (2) to the Source MME 504. Information such as Target TAI (Tracking Area ID) is included in the Handover Required (2). The Source MME 504 refers to the information and determines execution of an inter-RAT (Radio Access Technology) handover to the Target SGSN 505.

In this example, in selecting the Target SGSN 505, the Source MME 504 uses information of a customized MME connection request held therein. In selecting the Target SGSN 505, the Source MME 504 may use a local configuration, based on the information of a customized MME connection request. Alternatively, the Source MME 504 may use a local configuration held therein to select the Target SGSN 505. The Source MME 504 may select the Target SGSN 505 by setting the information of a customized MME connection request along with location information such as a target ID and issuing "DNS Query" to the DNS server 508.

When the Source MME 504 determines execution of an Inter RAT handover to the Target SGSN 505, the Source MME 504 transmits a Forward Relocation Request (3) to the Target SGSN 505. The Source MME 504 may set the information of a customized MME connection request held therein in this signal.

When the Target SGSN 505 executes another Inter RAT handover, the Target SGSN 505 can select a Customized MME by using the information of a customized MME connection request.

For the subsequent sequence, Inter RAT handover processing is performed in accordance with related technology.

EXAMPLE 14

As example 14, an example of a handover from a Customized SGSN to a customize MME in EPC will be described. While the configuration according to example 14 is the same as that illustrated in FIG. 22, the handover is performed in the opposite direction.

The sequence illustrating an example of an operation according to example 14 is basically the same as that illustrated in FIG. 23, except that the description (operation sequence) of the SGSN and the description (operation sequence) of the MME are switched and that the description (operation sequence) of the RNC and the description (operation sequence) of the eNodeB are reversed (the sequence operation is performed in the opposite direction).

EXAMPLE 15

Figure 24:
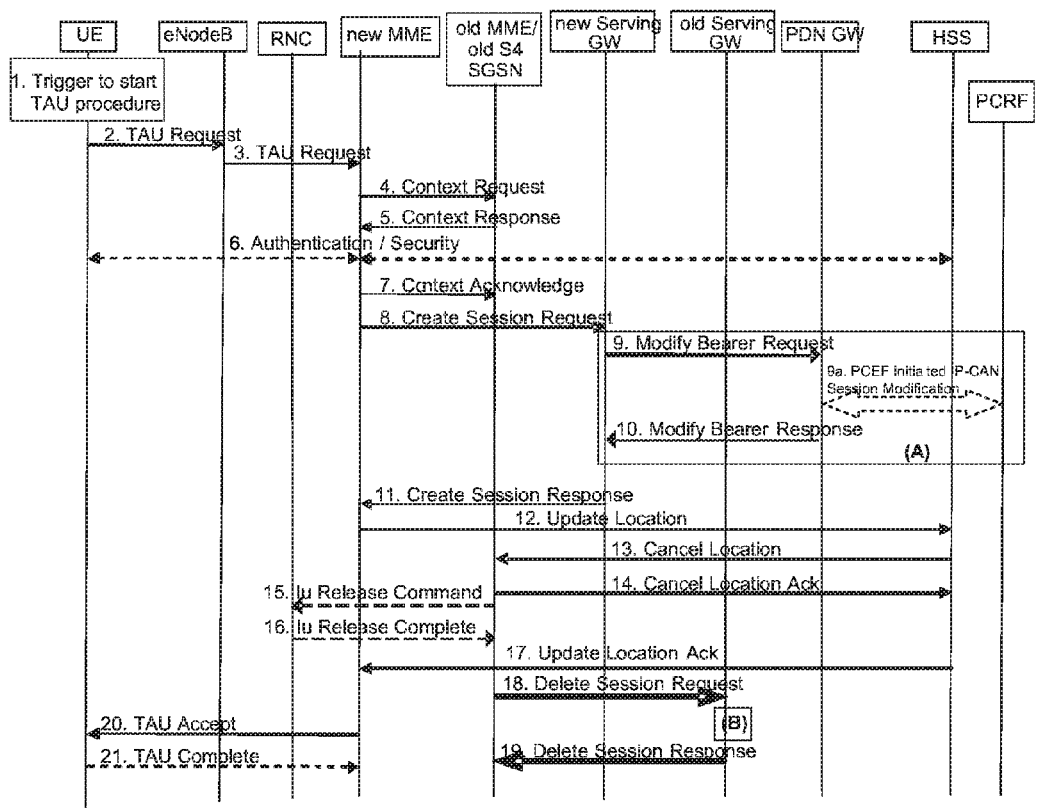
FIG. 24 illustrates an example of a sequence according to a fifteenth example of the present invention.

As example 15, an example with EPC will be described. In this example, a UE transmits a Tracking Area Update (TAU) and the UE is connected to a Customized MME. The configuration according to example 15 is the same as that according to example 1. FIG. 24 is a sequence diagram illustrating an example of an operation according to example 15. FIG. 24 is based on FIG. 5.3.3.1-1: Tracking Area Update procedure with Serving GW change in 3GPP TS23.401, and the sequence numbers are in accordance with the figure. As for details of each sequence, reference may be made to description of TS23.401 5.3.3. The following describes the operation with reference to FIGS. 1 and 24.

To transmit a TAU Request (3) to an MME, first, the UE 1 establishes RRC (Radio Resource Control) connection with the eNodeB 11. To establish RRC Connection, first, the UE 1 transmits an RRC Connection Request signal to the eNodeB 11.

In this RRC Connection Request signal, the UE 1 sets one or more parameters indicating that the UE 1 needs to be connected to the Customized MME 22 (User Identity, a new Value or a new parameter of Establishment Cause (a value or a parameter newly introduced in the present example), or an identifier of a part of such a parameter (a PLMN-id included in the IMSI, for example)).

The UE 1 is implemented with a new parameter of the RRC Connection Request (a new Value or a new parameter of Establishment Cause). Thus, by using the RRC Connection Request, the UE 1 notifies the eNodeB that the UE 1 can be connected to the Customized MME.

Upon reception of the RRC Connection Request signal, the eNodeB 11 stores information indicating that the UE 1 needs to be connected to the Customized MME 22 and continues the subsequent RRC connection procedure.

After establishing RRC connection, the UE 1 transmits a TAU Request (2) and the eNodeB 11 receives the TAU Request (2). From the information stored when the eNodeB 11 has received the RRC Connection Request, the eNodeB 11 forwards a TAU Request (3) to the Customized MME 22. The eNodeB 11 sets a new parameter of the RRC Connection Request (a new Value or a new parameter of Establishment Cause) to notify that the UE 1 can be connected to the Customized MME received in the RRC Connection Request, in the TAU Request (3). The eNodeB 11 notifies the Customized MME 22 of the new parameter.

Upon reception of the TAU Request (3), the Customized MME 22 continues a normal TAU Procedure. The Customized MME 22 holds the new parameter of the RRC Connection Request (a new Value or a new parameter of Establishment Cause) to notify that the UE 1 can be connected to the Customized MME received in the RRC Connection Request, the new parameter being set in the received TAU Request (3).

The UE 1 may have a function of instructing the eNodeB 11 about which one of the general MME 21 and the Customized MME 22 is to be connected to the UE 1. Since the UE 1 cannot store information about all the MMEs in the core network, information indicating an MME type, a service type, or the like is used for the instruction given to the eNodeB 11, instead of an identifier by which a unique MME can be selected.

The eNodeB 11 may have a function of deciding which MME is to be connected to the UE 1.

As described above, one of or a combination of User Identity, a new Value or a new parameter of a communication establishment cause (Establishment Cause), and an identifier of a part of such a parameter in the RRC Connection Request is used for selection of an MME by the eNodeB 11. Examples of the new parameter include an APN and an ID that identifies an MTC group.

As described above, in the present example, the UE instructs the eNodeB to select an MME. In response to the instruction, the eNodeB specifies the Customized MME to continue a TAU Procedure. In this way, an appropriate MME can be caused to register the location of the UE.

EXAMPLE 16

Figure 25:
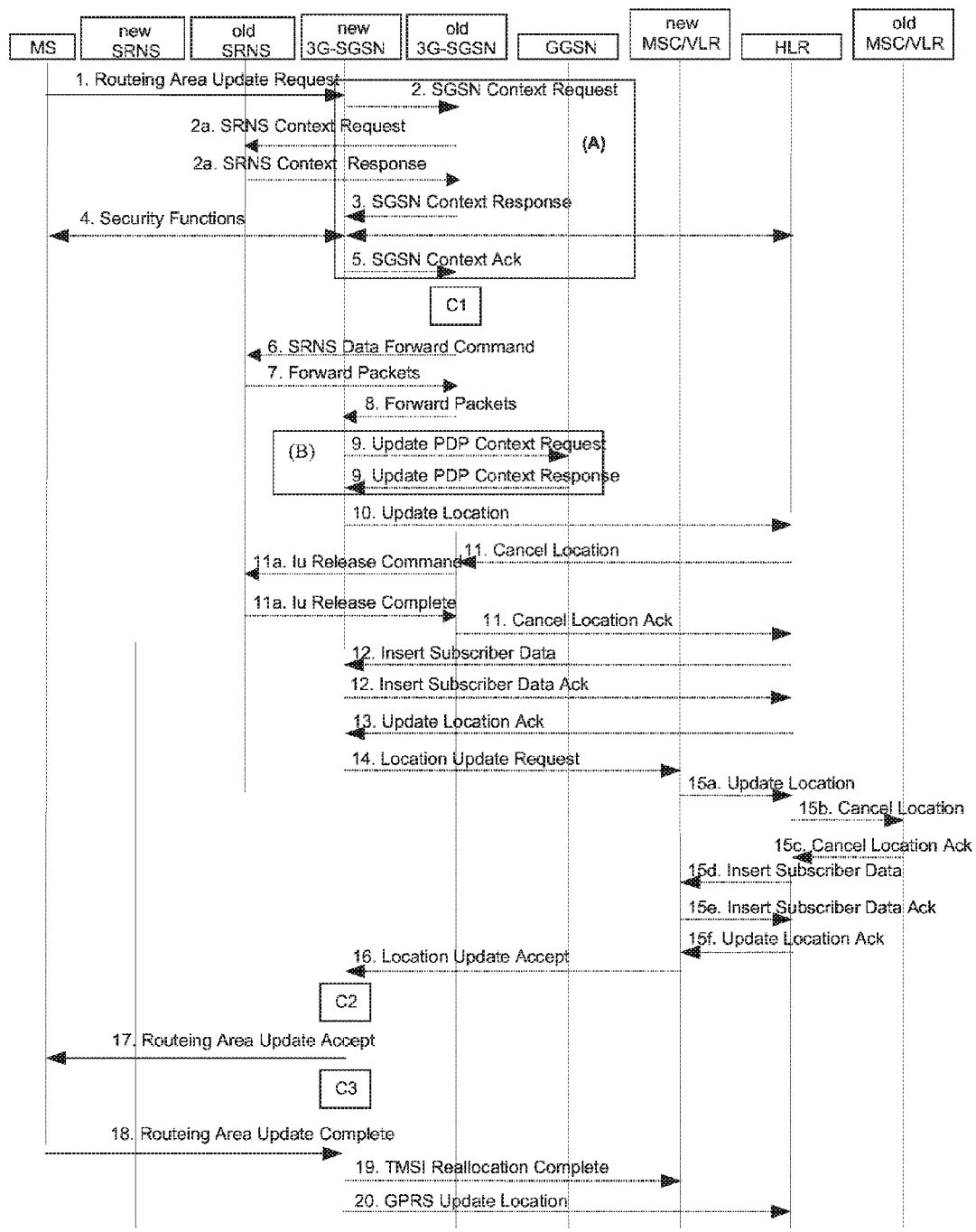
FIG. 25 illustrates an example of a sequence according to a sixteenth example of the present invention.

As example 16, an example with UMTS will be described. In this example, a UE transmits a Routing Area Update signal and the UE is connected to a Customized SGSN. The configuration according to example 16 is the same as that according to example 6. FIG. 25 is a sequence diagram illustrating an example of an operation according to example 16. FIG. 25 is based on FIG. 36: Iu mode RA Update procedure in 3GPP TS23.060, and the sequence numbers are in accordance with the figure. As for details of each sequence, reference may be made to description of TS23.060 6.9.2 (while a terminal is denoted by MS in FIG. 36 of 3GPP TS23.060, the terminal is denoted by UE in FIG. 25). The following describes the operation with reference to FIGS. 2 and 25.

In order to transmit a Routing Area Update Request to an SGSN, first, the UE 101 establishes RRC connection with the RNC 11. In order to establish RRC Connection, first, the UE 101 transmits an RRC Connection Request signal to the RNC 171.

In this RRC Connection Request signal, the UE 101 sets one or more parameters indicating that the UE 101 needs to be connected to the Customized SGSN 122 (User Identity, a new Value or a new parameter of Establishment Cause (a value or a parameter newly introduced in the present example), or an identifier of a part of such a parameter (a PLMN-id included in the IMSI, for example)).

Upon reception of the RRC Connection Request signal, the RNC 171 stores information indicating that the UE 101 needs to be connected to the Customized SGSN 122 and continues the subsequent RRC connection procedure.

After establishing RRC connection, the UE 101 transmits a Routing Area Update Request (1), and the NodeB 111 receives the Routing Area Update Request (1). Next, the NodeB 111 forwards the Routing Area Update Request (1) to the RNC 171.

The RNC 171 forwards the Routing Area Update Request (1) to an SGSN. From the information stored in the RNC 171 upon reception of the RRC Connection Request signal, the RNC 171 forwards the Routing Area Update Request (1) to the Customized SGSN 122. In the Routing Area Update Request, the RNC 171 sets one or more parameters (User Identity, a new Value or a new parameter of Establishment Cause (a new Value or parameter introduced in the present example), or an identifier of a part of such a parameter (a PLMN-id included in the IMSI, for example)). As indicated in the RRC Connection Request received by the RNC 171, the parameter indicates that the UE 101 needs to be connected to the Customized SGSN 122. Thus, the Customized SGSN 122 is notified of the parameter.

Upon reception of the Routing Area Update Request, the Customized SGSN 122 continues a normal Routing Area Update procedure. The Customized SGSN 122 holds the parameter (User Identity, a new Value or a new parameter of Establishment Cause (a new Value or parameter introduced in the present example), or an identifier of a part of such a parameter (a PLMN-id included in the IMSI, for example)), the parameter set in the received Routing Area Update Request and indicating that the UE 101 needs to be connected to the Customized SGSN 122.

The UE 101 has a function of instructing the RNC 171 about which one of the general SGSN 121 and the Customized SGSN 122 is to be connected to the UE 1. Since the UE 101 cannot store information about all the SGSNs in the core network, information indicating an SGSN type, a service type, or the like is used for the instruction given to the RNC 171, instead of an identifier by which a unique SGSN can be selected.

The RNC 171 has a function of deciding which SGSN is to be connected to the UE 101. As described above, this decision is performed by using User Identity, a new Value or a new parameter of Establishment Cause (a new Value or parameter introduced in the present example), an identifier of a part of such a parameter (a PLMN-id included in the IMSI, for example), or a combination thereof. Examples of the new parameter include an APN and an ID that identifies an MTC group.

As described above, in the present example, the UE 101 instructs the RNC 171 to select an SGSN. In response to the instruction, the RNC 171 specifies the Customized SGSN to continue a Routing Area Update Procedure. In this way, the UE 101 can perform location registration in an appropriate SGSN.

The following describes several cases where a core network (CN) node is selected based on the above exemplary embodiments and examples.

An MTC (Machine Type Communication) device (an M2M device) is connected to a customized CN node (a node streamlined for MTC devices).

A user using the MBMS is connected to a customized CN node (an MBMS-compatible CN node).

To start a new service in a small scale, the service is provided only by a customized CN node(s).

A specific UE is connected to a node in which an MME and an SGW are collocated. Though not particularly limited, for example, there is a case where a small amount of data traffic is transmitted to a UE via an SMS (Short Message Service). In such a case, if an MME and an SGW are collocated, implementation of SMS conversion processing can be facilitated.

MMEs may be sorted depending on a terminal type (CSFB (CS Fallback) terminal and a VoLTE terminal, for example). CSFB (CS Fallback) is a function of switching radio to 3G (or 2G) when a CS (Circuit Switched) service is transmitted or received during LTE connection. VoLTE (Voice over LTE) is a function of providing a voice (which has been provided via a CS) service on LTE. The CSFB terminal needs to interwork with an MSC. The VoLTE terminal needs to interwork with an IMS. With CSFB, an MSC that is first attached is caused to select a collocated MME.

The disclosure of the above PTL is incorporated herein by reference thereto. Modifications and adjustments of the exemplary embodiments and examples are possible within the scope of the overall disclosure (including the claims) of the present invention and based on the basic technical concept of the present invention. Various combinations and selections of various disclosed elements are possible within the scope of the claims of the present invention. That is, the present invention of course includes various variations and modifications that could be made by those skilled in the art according to the overall disclosure including the claims and the technical concept.

The invention claimed is:

1. A mobile communication system, comprising:
   a terminal;
   a radio access network node; and
   a plurality of MMEs (Mobility Management Entities) or SGSNs (Serving GPRS Support Nodes),
   wherein the terminal configured for Low Access Priority provides the radio access network node with LAPI (Low Access Priority Indication) which is information indicating that RRC (Radio Resource Control) connection request of the terminal has Low Access Priority and informs a source MME or a source SGSN via the radio access network node of the LAPI to cause the source MME or the source SGSN to store the LAPI, and
   wherein the source MME or the source SGSN selects a target MME or a target SGSN dedicated for the terminal configured for Low Access Priority based on the LAPI stored in the source MME or the source SGSN, when the terminal configured for Low Access Priority performs a handover.

2. A terminal for a mobile communication system including a radio access network node and a plurality of MMEs (Mobility Management Entities) or SGSNs (Serving GPRS Support Nodes), the terminal comprising a hardware controller configured to:
   provide the radio access network node with LAPI (Low Access Priority Indication) and inform a source MME or a source SGSN via the radio access network node of the LAPI, wherein the LAPI indicates that an RRC (Radio Resource Control) connection request has Low Access Priority; and
   cause the source MME or the source SGSN to store the LAPI,
   wherein the terminal causes the source MME or the source SGSN to select a target MME or a target SGSN dedicated for the terminal configured for Low Access Priority based on the LAPI stored in the source MME or the source SGSN, when the terminal configured for Low Access Priority performs a handover.

3. A communication method for a mobile communication system including a terminal, a radio access network node and a plurality of MMEs (Mobility Management Entities) or SGSNs (Serving GPRS Support Nodes), the method comprising the steps of:
   providing, by the terminal configured for Low Access Priority, the radio access network node with LAPI (Low Access Priority Indication) which is information indicating that RRC (Radio Resource Control) connection request of the terminal has Low Access Priority and informing a source MME or a source SGSN via the radio access network station of the LAPI; and
   selecting, by the source MME or the source SGSN, a target MME or a target SGSN dedicated for the terminal configured for Low Access Priority based on the LAPI stored in the source MME or the source SGSN, when the terminal configured for Low Access Priority performs a handover.

4. A communication method of a terminal for a mobile communication system including a radio access network node and a plurality of MMEs (Mobility Management Entities) or SGSNs (Serving GPRS Support Nodes), the method comprising the steps of:
   having LAPI (Low Access Priority Indication) which is information indicating that RRC (Radio Resource Control) connection request has the Low Access Priority;
   providing the radio access network node with the LAPI and informing a source MME or a source SGSN via the radio access network node of the LAPI; and
   causing the source MME or the source SGSN to store the LAPI,
   wherein the terminal causes the source MME or the source SGSN to select a target MME or a target SGSN dedicated for the terminal configured for Low Access Priority based on the LAPI stored in the source MME or the source SGSN, when the terminal configured for Low Access Priority performs a handover.

5. A mobility management node (an MME (Mobility Management Entity) or an SGSN (Serving GPRS Support Node)) for a mobile communication system including a terminal and a radio access network node, comprising:
  a memory that stores a set of instructions; and
  a hardware processor configured to execute the set of instructions to:
    to receive LAPI (Low Access Priority Indication) which is information indicating that RRC (Radio Resource Control) connection request of the terminal configured for Low Access Priority has Low Access Priority, via the radio access network node, from the terminal configured for Low Access Priority and store the LAPI; and
    to select the mobility management node that is a handover target and that is dedicated for the terminal configured for Low Access Priority based on the LAPI stored in the mobility management node that is a handover source, when the terminal configured for Low Access Priority performs the handover.

6. A method of a mobility management node (an MME (Mobility Management Entity) or an SGSN (Serving GPRS Support Node)) for a mobile communication system including a terminal and a radio access network node, comprising:
  receiving LAPI (Low Access Priority Indication), which is information indicating that RRC (Radio Resource Control) connection request of the terminal configured for Low Access Priority has Low Access Priority, via the radio access network node from the terminal configured for Low Access Priority and storing the LAPI; and
  selecting the mobility management node that is a handover target and that is dedicated for the terminal configured for Low Access Priority based on the LAPI stored in the mobility management node that is a handover source, when the terminal configured for Low Access Priority performs the handover.

* * * * *

UNITED STATES PATENT AND TRADEMARK OFFICE
CERTIFICATE OF CORRECTION

PATENT NO. : 9,883,440 B2
APPLICATION NO. : 14/902656
DATED : January 30, 2018
INVENTOR(S) : Zembutsu et al.

It is certified that error appears in the above-identified patent and that said Letters Patent is hereby corrected as shown below:

Claim 3, Column 34, Line 46, "radio access network station" should read --radio access network node--.

Signed and Sealed this
Twenty-fourth Day of April, 2018

Andrei Iancu
*Director of the United States Patent and Trademark Office*